(12) United States Patent
Vajravel et al.

(10) Patent No.: US 11,204,877 B2
(45) Date of Patent: Dec. 21, 2021

(54) MINIMIZING DATA WRITTEN TO DISK AND ENABLING DIRECTORY CHANGE NOTIFICATIONS IN MULTI-VOLUME FILTER ENVIRONMENTS

(71) Applicant: Dell Products L.P., Round Rock, TX (US)

(72) Inventors: Gokul Thiruchengode Vajravel, Bangalore (IN); Jyothi Bandakka, Bengaluru (IN); Ankit Kumar, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 16/656,900

(22) Filed: Oct. 18, 2019

(65) Prior Publication Data

US 2021/0117332 A1    Apr. 22, 2021

(51) Int. Cl.
*G06F 12/0875*     (2016.01)
*G06F 16/11*       (2019.01)
*G06F 16/23*       (2019.01)

(52) U.S. Cl.
CPC ......... *G06F 12/0875* (2013.01); *G06F 16/11* (2019.01); *G06F 16/2379* (2019.01); *G06F 2212/1016* (2013.01)

(58) Field of Classification Search
CPC .................................................. G06F 12/0875
USPC .......................................................... 711/118
See application file for complete search history.

(56) References Cited

U.S. PATENT DOCUMENTS

| 6,170,050 B1 * | 1/2001 | Koppala ............. G06F 9/30134 712/210 |
| 2012/0198162 A1 * | 8/2012 | Chachad ................ H03K 21/00 711/122 |

* cited by examiner

*Primary Examiner* — Jae U Yu
(74) *Attorney, Agent, or Firm* — Kirton McConkie; Brian Tucker

(57) ABSTRACT

The amount of data that is written to disk is minimized when an overlay optimizer is used in conjunction with a write filter to prevent the overlay from becoming full. An overlay optimizer minifilter can be used to intercept writes that were initiated by the overlay optimizer's request to commit files cached in the write filter's overlay to thereby extract only the modified portions of the files that are actually stored in the overlay. The overlay optimizer minifilter can then write these modified portions of the files, as opposed to the entire files, in the overlay cache. Directory change notifications are also enabled when a write filter is employed as well as in other multi-volume filter environments.

20 Claims, 22 Drawing Sheets

MINIMIZING DATA WRITTEN TO DISK AND ENABLING DIRECTORY CHANGE NOTIFICATIONS IN MULTI-VOLUME FILTER ENVIRONMENTS

CROSS-REFERENCE TO RELATED APPLICATIONS

N/A

BACKGROUND

Operating systems, such as Windows, provide functionality for preventing the content of a storage medium from being changed. In a typical example, it may be desirable to prevent the operating system image, which may be stored on a particular disk partition or on flash media, from being changed at runtime. As one example only, Windows 10 provides the Unified Write Filter (UWF) which can be used to redirect all writes that target the operating system image to a RAM or disk cache called an overlay. This overlay stores changes made to the operating system at runtime but is removed when the device is restarted thereby restoring the device to its original state.

In this specification, a volume should be construed as a logical unit that represents an area of persistent storage to the file system. A volume can correspond to a single physical storage device, such as a hard disk, but can also correspond to a single partition on a physical storage device with multiple partitions. A volume can also span across multiple physical storage devices. A "protected volume" is a volume that a write filter protects. In other words, when a write filter is employed, the write filter will protect the content (e.g., files, directories, registry entries, etc.) of the volume from being changed.

FIG. 1 illustrates a simplified Windows-based I/O system architecture 100 when a write filter 140 is employed. Write filter 140 may typically be the Windows UWF but may equally be another third-party write filter. Architecture 100 includes a disk 105 which may oftentimes be a solid-state drive (SSD) but may represent a physical hard disk, an internal USB device, an external SATA device or any other physical storage medium (or media) that may be compatible with a write filter. In accordance with the definition of a volume, disk 105 includes an area of persistent storage that is represented by a volume. Disk stack 110 represents the various drivers that enable disk 105 to be accessed and are not critical to an understanding of the present invention.

In the Windows operating system, when write filter 140 is employed to protect the content of a volume from modification, two different I/O stacks that represent the protected volume are loaded above disk stack 110: a "protected I/O stack" that includes volume stack 120a and file system stack 130a; and an "unprotected I/O stack that includes volume stack 120b and file system stack 130b. The protected I/O stack can be viewed as the primary I/O stack and handles I/O requests that do not modify content on the protected volume (e.g., read requests). The unprotected I/O stack can be viewed as a pseudo I/O stack and handles I/O requests that modify content on the protected volume (e.g., write requests). For purposes of this description and the claims, a write request should be construed as encompassing I/O requests that modify existing content and I/O requests that create new content. The limited scenarios where such write requests would occur to the protected volume are described below.

Write filter 140 is loaded above file system stack 130a on the protected I/O stack so that it can intercept all requests to access the content of the protected volume. When write filter 140 receives a request to read content from the protected volume, and assuming the content was not previously modified and stored in overlay 150, it can send the request down the protected I/O stack so that the content will be read from disk 105 in a typical manner. In contrast, when write filter 140 receives a request to write content on the protected volume, it redirects the request so that the write is made in overlay 150 (i.e., the new/modified content is stored in overlay 150 while the content stored on disk 105 remains unchanged). Once modified content is stored in overlay 150, write filter 140 will ensure that any subsequent request to access the modified content will be completed using the modified content stored in overlay 150.

There are some scenarios where write filter 140 will allow content on the protected volume to be modified. For example, an administrator can register an exclusion with write filter 140 for particular content on the protected volume (e.g., particular files or folders). In such cases, write filter 140 will not redirect any request that would modify the excluded content to overlay 150, but instead will cause the request to be passed down the unprotected I/O stack thereby causing the excluded content to be modified on the protected volume. As another example, write filter 140 enables an administrator to cause modified content stored in overlay 150 to be committed to disk 105. In such cases, when write filter 140 detects the write request pertaining to the commit, it will cause it to be passed down the unprotected I/O stack. Accordingly, even when write filter 140 is employed, it is still possible to modify some content on the protected volume.

U.S. Pat. Publ. No. 2018/0217940 (the '940 Publication) describes how an overlay-managing write filter (or an "overlay optimizer") can be employed to optimize the performance of write filter 140. As explained in the '940 Publication, a primary role that an overlay optimizer plays is to prevent a system reboot due to overlay 150 becoming full. In general terms, an overlay optimizer, which can be loaded above write filter 140, can accomplish this by moving content that is stored in overlay 150 to a separate overlay cache. This separate overlay cache may be implemented as a directory on the protected volume that is registered as an exclusion or as a separate partition of disk 105 (i.e., an unprotected volume). In either case, write filter 140 will not block writes to the overlay cache. Once modified content is moved from overlay 150 to the overlay cache, the overlay optimizer can redirect subsequent requests to access the modified content.

Although this technique is effective to prevent the overlay from becoming full, it oftentimes results in a large amount of data being written to disk. FIGS. 2A and 2B generally illustrate why this is. FIGS. 2A and 2B show portions of architecture 100 with the addition of overlay optimizer 200 which can be in the form of a file system minifilter driver that is loaded above write filter 140. In these figures, it is assumed that a file, File A, is stored on the protected volume on disk 105 and has a size of 100 MB. It is also assumed that, during use of the computing device, a request to modify file A was made and that write filter 140 redirected this request to overlay 150 so that File A on the protected volume remains unmodified.

Notably, when redirecting a request to modify a file on the protected volume, write filter 140 does not store the entire file in overlay 150 but only stores the modified portions of the file (e.g., each page that is modified). In the depicted example, it is assumed that the request to modify File A only modified a single 4 KB page of the file. Accordingly, FIG. 2A shows that overlay 150 stores only the single 4 KB modified page. Additionally, even though write filter 140 only stores the modified portions (e.g., pages) in overlay 150, it does not provide any way to detect which modified portions are stored in overlay 150. To the contrary, write filter 140 only provides functionality for determining which files are cached in overlay 150 (or more correctly, which files have modified portions stored in overlay 150). For example, in Windows, the UWF_Overlay.GetOverlayFiles method can be called to obtain a list of files that are cached in overlay 150, but the UWF does not provide a way to determine which pages of these files are actually stored in overlay 150.

Although not depicted in FIG. 2A, it is assumed that the operation of write filter 140 has caused many other modified pages of files to be stored in overlay 150 such that overlay 150 has grown beyond some threshold percentage of its capacity (e.g., 60% of its maximum size). In such scenarios, overlay optimizer 200 can detect that overlay 150 is becoming full as is represented by step 1. Upon determining that overlay 150 is becoming full, overlay optimizer 200 can commence moving files from overlay 150 to the overlay cache (which is assumed to be on disk 105). For the reasons given above, overlay optimizer 200 can only detect which files have modified portions stored in overlay 150 but cannot identify only the modified portions. Accordingly, to move File A to the overlay cache, overlay optimizer 200 will issue a request to read File A as represented in step 2.

This request will be intercepted by write filter 140. Then, in step 3 shown in FIG. 2B, write filter 140 will complete the read request by providing to overlay optimizer 200 the entire modified File A (i.e., the 100 MB version on the protected volume with the 4 KB modified page from overlay 150). In step 4, overlay optimizer 200 will issue a request to write the 100 MB modified File A to the overlay cache. Assuming the overlay cache is implemented as a folder on the protected volume that is registered as an exclusion, write filter 140 will redirect this write down the unprotected I/O stack rather than redirecting it to overlay 150. Finally, in step 5, overlay optimizer 200 will request deletion of File A which will cause write filter 140 to discard the modified page of File A from overlay 150 (but will not alter the unmodified File A stored on the protected volume).

As can be seen, because overlay optimizer 200 has no way of identifying that only a single page of File A exists in overlay 150, it must copy the entire File A to the overlay cache as part of freeing up overlay 150. Considering that overlay optimizer 200 may typically move many files in this manner to free up overlay 150, a large amount of data will be written to disk 105 which can create a number of problems. For example, SSDs, which are typically comprised of NAND flash, wear out over time. Therefore, SSD manufacturers typically provide a warranty up to a specified total amount of data written to the SSD which is usually defined as terabytes written or TBW. With the use of overlay optimizer 200, it is possible that the amount of data written to disk 105 over the warranty period may exceed the TBW. To avoid this, overlay optimizer 200 may be configured to forego moving files from overlay 150 after a certain amount of data has been written each day. Although this may preserve the life of the SSD, it increases the likelihood of a forced reboot as overlay 150 becomes full. Even if disk 105 is not an SSD, the large amount of data that overlay optimizer 200 may write to disk 105 when freeing up overlay 150 can still degrade overall system performance. In short, it would be more efficient if overlay optimizer 200 could move only the modified portions of files from overlay 150 rather than copying the entire file.

Certain applications, such as Windows Explorer, custom shells, file system watchers, antivirus software, source code editors, etc., are configured to monitor the contents of a directory. Oftentimes, these applications will register for directory change notifications (DCNs) rather than enumerating the directory on demand. For example, in Windows, an application can employ the FindFirstChangeNotification function to register to be notified when a specified change occurs to/within a directory. These changes may include any change to the name or size of a file in the directory, a change to the name or attributes of the directory, a change in the security of the directory, etc. Once registered, the application will be notified whenever any of the specified changes occur and can take whatever action is appropriate.

Waiting for a DCN is similar to having a read operation pending against a directory and, if necessary, its subdirectories. When something changes within the directory being watched, the read operation is completed. Accordingly, the DCN functionality is primarily implemented within the file system stack for the volume containing the directory (or more specifically, by the file system driver in the file system stack).

In multi-volume architectures, such as Windows-based I/O system architecture 100, DCNs will not work properly. With reference to FIG. 1, when an application sends a DCN request for a particular directory on the protected volume, the DCN request will be provided to file system stack 130a only (e.g., similar to pending a read request with the file system driver in file system stack 130a). However, the DCN request will not be provided to file system stack 130b. As a result, the application will only receive a DCN when an I/O request that passes through file system stack 130a causes the specified change(s) to the directory. In contrast, if an I/O request that passes through file system stack 130b causes the specified change(s) to the directory, no DCN will be generated because file system stack 130b will be unaware of the DCN request. In short, when write filter 140 is used, an application that relies on DCNs will not be notified of all directory changes for which it has registered.

One specific example highlights the difficulties that this problem can create. Windows Explorer is configured to use DCNs to be immediately notified when a folder or file is created in a particular directory. This ensures that the newly created folder or file will be immediately displayed within the Explorer window. In write filter environments, however, a user may open Windows Explorer to view the contents of a particular directory (or folder) and right click to select the option to create a new folder. If the directory whose contents is being displayed is part of the protected volume, the request to create the new folder will be handled through file system stack 130b which is unaware of Windows Explorer's DCN. Windows Explorer will therefore not receive a DCN even though a new folder was created in the directory for which it registered for DCNs. As a result, a new folder will be created but Windows Explorer will not update its user interface to include the new folder. Most users in this situation would be unfamiliar with write filters and may assume that a new folder was not created. Even if a user suspected that the write filter may be the cause of the problem, he or she would likely be unaware of how to force Windows Explorer to enumerate the contents of the directory and update its user interface to display the existence of the new folder.

This issue is not limited to the multi-volume write filter architecture depicted in FIG. 1 but exists in any multi-volume filter environment. For example, deduplication, mirroring and caching solutions typically employ a filter that is loaded on the primary I/O stack, similar to write filter 140 and the protected I/O stack in FIG. 1, and one or more shadow volumes where each shadow volume would have a corresponding I/O stack similar to the unprotected I/O stack shown in FIG. 1. Therefore, as a practical matter, applications/services that rely on DCNs only work properly when a directory is not spread across more than one volume.

BRIEF SUMMARY

The present invention extends to methods, systems and computer program products for minimizing the amount of data that is written to disk when an overlay optimizer is used in conjunction with a write filter to prevent the overlay from becoming full. To minimize the amount of data written to disk, a first instance of an overlay optimizer minifilter can be loaded above the write filter on the protected I/O stack and a second instance of the overlay optimizer filter can be loaded on the unprotected I/O stack. The second instance of the overlay optimizer minifilter can be used to intercept writes that were initiated by the overlay optimizer's request to commit files cached in the write filter's overlay to thereby extract only the modified portions of the files that are actually stored in the overlay. The second instance of the overlay optimizer minifilter can then write these modified portions of the files, as opposed to the entire files, in the overlay cache. In this way, a minimal amount of data is written to disk when freeing up the overlay.

The present invention also extends to methods, systems and computer program products for enabling directory change notifications when a write filter is employed as well as in other multi-volume filter environments. When a directory change notification is received by the first instance of the overlay optimizer minifilter, it can create and issue duplicate DCN requests to each I/O stack while pending the original DCN request. A DCN map can be used to associate the duplicate DCN requests with the pended DCN request so that contents of a completed DCN request can be copied to the DCN request and then the DCN request can be completed. In this way, any changes made to the directory, regardless of which volume the change may have been made on, will trigger a DCN.

In one embodiment, the present invention is implemented—by an overlay optimizer that includes an overlay optimizer service, a first overlay optimizer minifilter that is loaded on a protected I/O stack and a second overlay optimizer minifilter that is loaded on an unprotected I/O stack—as a method for minimizing an amount of data that is written to disk when the overlay optimizer service reduces consumption of the write filter's overlay. The overlay optimizer service identifies a first file that is cached in the overlay and sends a first notification to the second overlay optimizer minifilter. The first notification identifies the first file. The overlay optimizer service then submits a request to commit the first file. The second overlay optimizer minifilter intercepts a write request that is being passed down the unprotected I/O stack. Based on the first notification, the second overlay optimizer minifilter determines that the write request pertains to the request to commit the first file. In response, the second overlay optimizer minifilter reparses the write request to an overlay cache.

In another embodiment, the present invention is implemented by a minifilter in a multi-volume filter environment as a method for enabling directory change notifications when a directory spans the multiple volumes. The minifilter receives a directory change notification (DCN) request that targets a first directory. In response, the minifilter creates a plurality of duplicate DCN requests corresponding to a plurality of I/O stacks and sends each of the plurality of duplicate DCN requests down the corresponding I/O stack. The minifilter also pends the DCN request. In response to any of the plurality of duplicate DCN requests being completed, the minifilter copies content of the completed duplicate DCN request to the DCN request and then completes the DCN request.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client device" should be construed as any user computing device that is capable of executing a write filter. A client device would therefore include desktops, laptops, tablets, thin clients, smart phones, etc. The term "write filter" should be construed as a software component that is employed to protect the content of a storage device from being modified by redirecting I/O requests that target the content so that the modifications are stored elsewhere. Embodiments of the present invention will be described in the context of a write filter provided with the Windows operating system (e.g., the UWF). However, embodiments of the present invention can equally be implemented on a client device that runs a non-Windows operating system as well as on a client device that runs Windows but employs another third party (i.e., non-Windows) write filter. Although the term "minifilter" is used in a Windows context, its use is exemplary and should not be construed as limiting the invention to Windows-based implementations. The term "overlay optimizer minifilter" should therefore be construed generally as a software component that can perform at least some of the functionality described herein.

Figure 1:
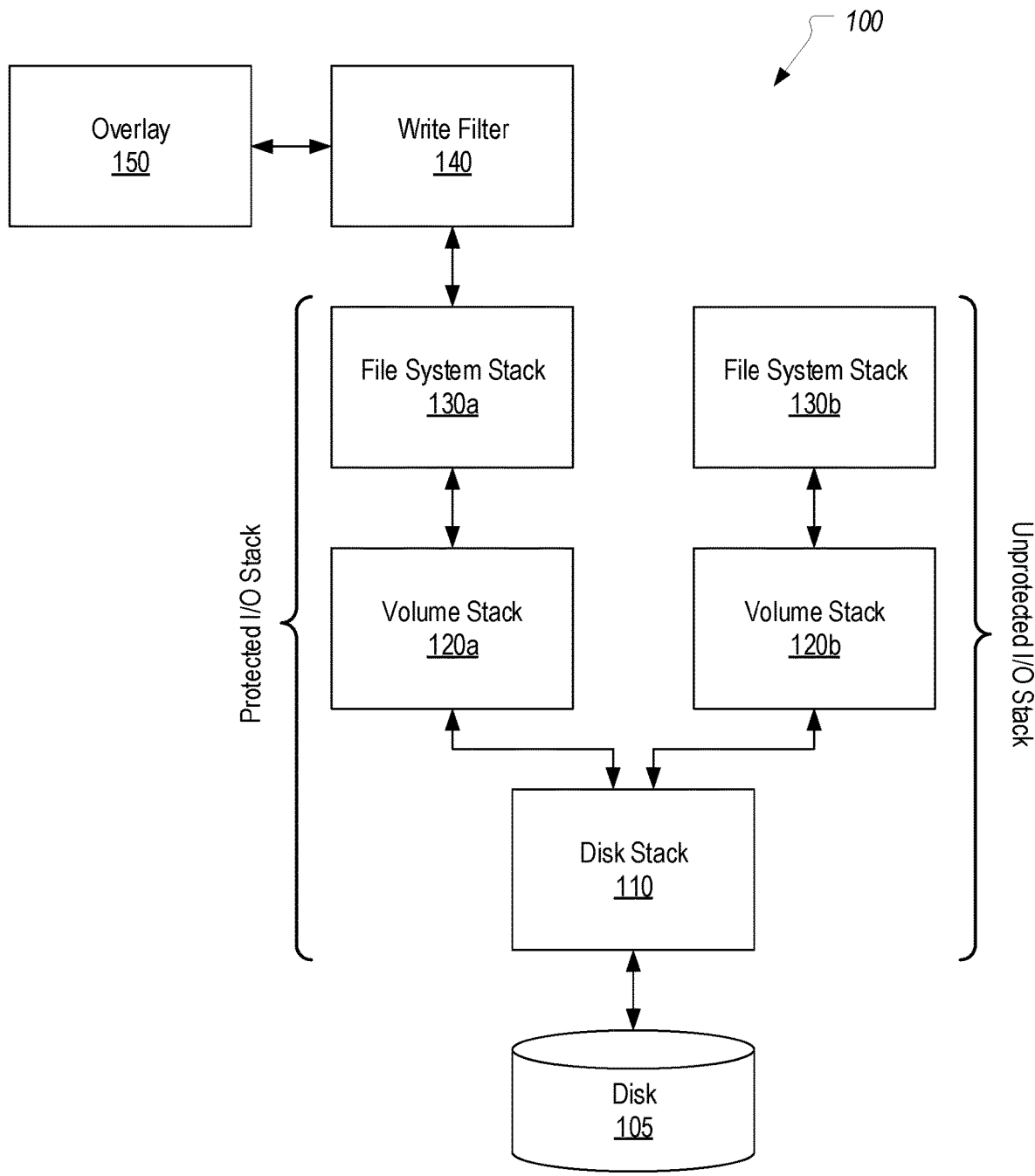
FIG. 1 illustrates a Windows-based I/O system in which a write filter is employed to redirect writes targeting a protected volume to an overlay.
Figure 2A:
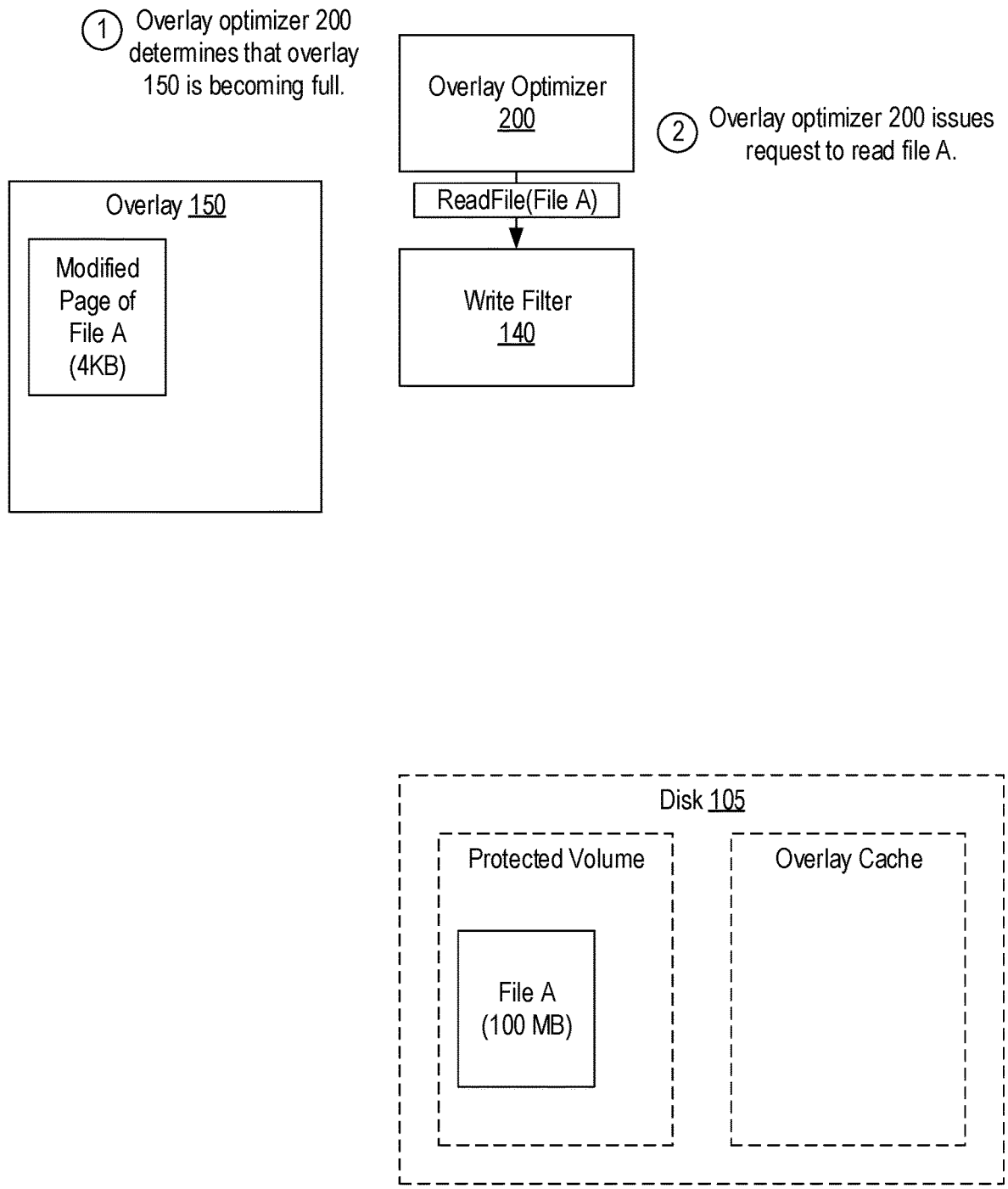
FIGS. 2A and 2B illustrate why a large amount of data may be written to disk when an overlay optimizer is employed to prevent the write filter's overlay from becoming full.
Figure 2B:
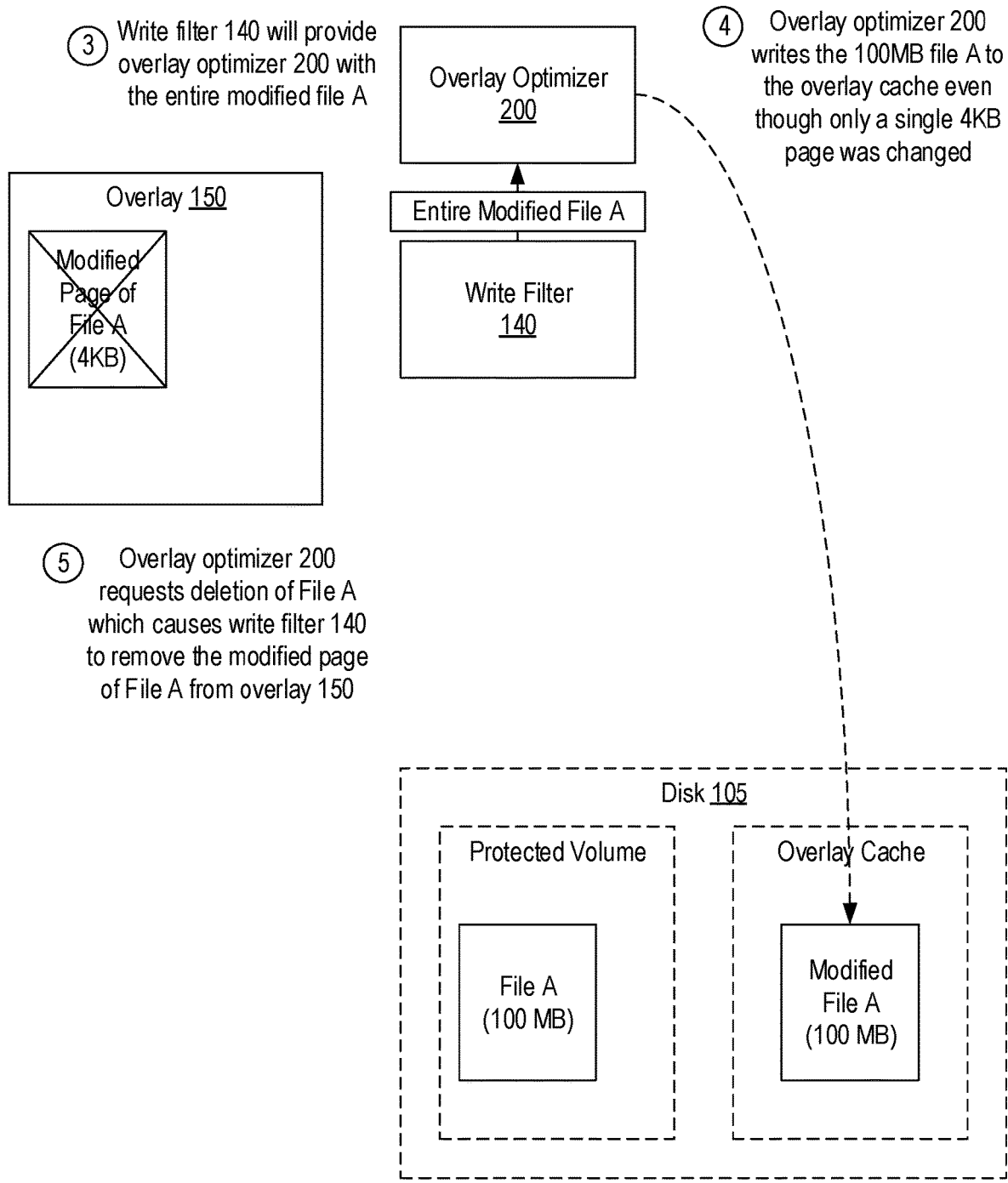
Figure 3:
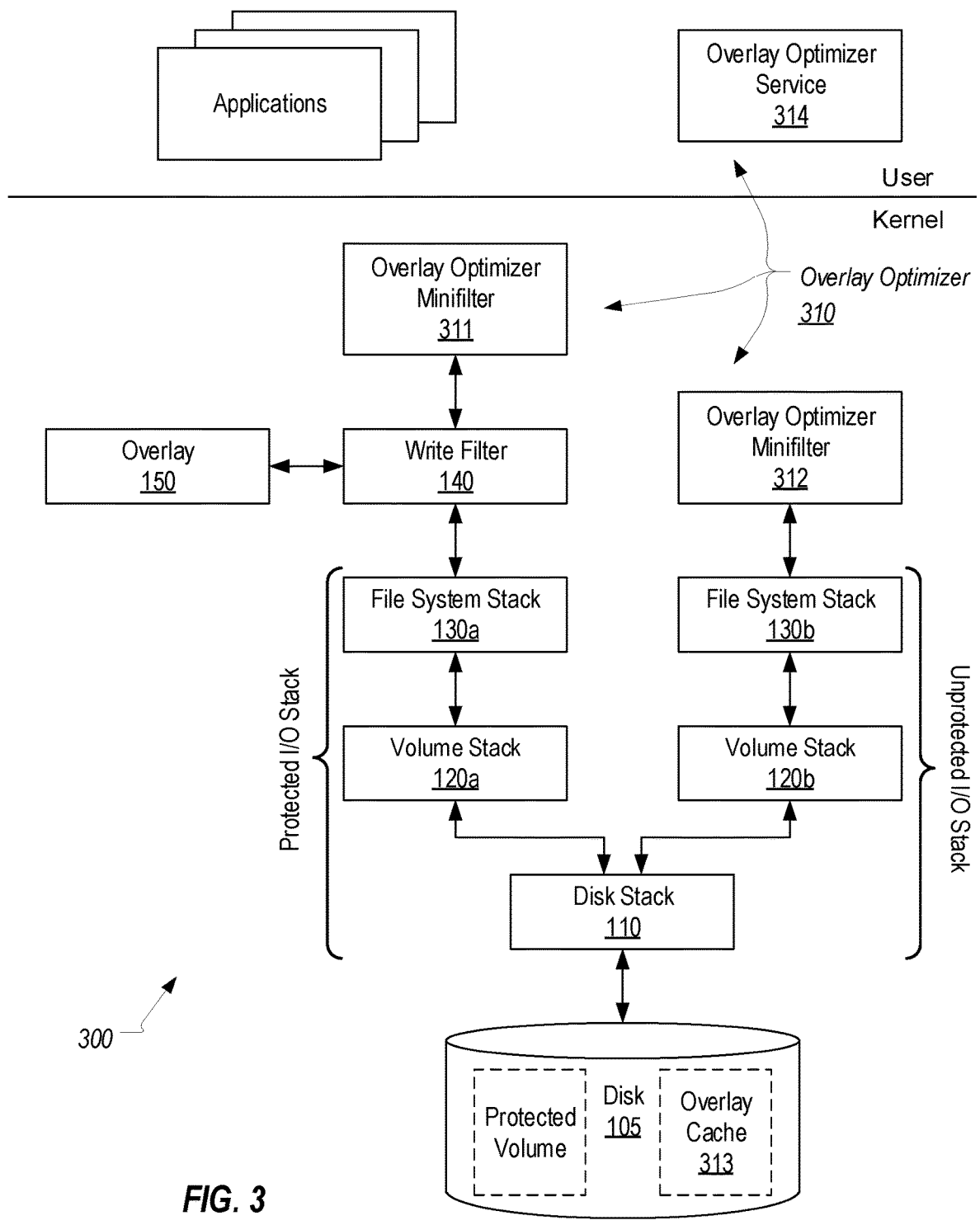
FIG. 3 illustrates an example I/O system architecture that may exist on a client device when the overlay optimizer of the present invention is implemented.

FIG. 3 illustrates an example I/O system architecture 300 that may exist on a client device when the present invention is implemented. In comparison to architecture 100, architecture 300 includes an overlay optimizer 310 which comprises: a first instance of an overlay optimizer minifilter 311 which is loaded on the protected I/O stack above write filter 140; a second instance of an overlay optimizer minifilter 312 which is loaded on the unprotected I/O stack; an overlay cache 313 implemented on disk 105; and an overlay optimizer service 314 which may be a user-mode component that executes with administrator privileges. As noted in the background, disk 105 need not represent a single physical storage device and overlay cache 313 may or may not be part of the protected volume. Architecture 300 can be employed to enable overlay optimizer 310 to identify and move only the changed portions of files that are stored in overlay 150 to overlay cache 313 as opposed to copying the entire files to overlay cache 313.

Prior to describing how overlay optimizer 310 moves only changed portions of files, the following overview is given to describe how overlay optimizer 310 can detect when it should start moving files from overlay 150. Overlay optimizer 310 can be configured to monitor the consumption of overlay 150 (e.g., by using overlay optimizer service 314 to periodically read the OverlayConsumption or AvailableSpace members of the UWF_Overlay class or to watch for the UWF_OVERLAY_REACHED_WARNING_LEVEL and/or UWF_OVERLAY_REACHED_CRITICAL_LEVEL events) to thereby detect when overlay 150 is becoming full. As one example only, overlay optimizer 310 could be configured to detect when consumption of overlay 150 has exceeded 60%. When overlay optimizer 310 detects that the consumption of overlay 150 has exceeded some threshold (i.e., that overlay 150 is becoming full), it can commence moving files from overlay 150 to overlay cache 313 to thereby prevent a reboot of the computing device (or severely degraded performance) which would otherwise occur once overlay 150 is full. In contrast to what is described in the background, overlay optimizer 310 can perform functionality for identifying the changed portions of files that are stored in overlay 150 so that only these changed portions will be written to overlay cache 313.

FIGS. 4A-4F illustrate the functionality that overlay optimizer 310 performs to identify the changed portions of files that are actually stored in overlay 150 to avoid having to copy the entire file to overlay cache 313. In step 1a shown in FIG. 4A, overlay optimizer service 314 can request the files that are cached in overlay 150. Typically, overlay optimizer service 314 would submit this request upon detecting that overlay 150 is becoming full. However, overlay optimizer 314 could equally submit such requests on a periodic basis with or without regard to the consumption of overlay 150. Accordingly, the manner in which overlay optimizer service 314 identifies which files are cached in overlay 150 is not essential to the present invention. In Windows-based implementations, overlay optimizer service 314 could employ the Windows Management Instrumentation (WMI) GetOverlayFiles( ) function to retrieve a listing of files that are cached in overlay 150.

In response to its request, overlay optimizer service 314 receives a list of the files cached in overlay 150 in step 1b. For the sake of illustration, FIG. 4A assumes that overlay 150 stores changed pages from File A, File B and File C among other files, and therefore, the list of files received in step 1b identifies these three files. Notably, this list does not provide any information about which portions of the three files are actually stored in overlay 150 but merely provides a filename (or path) to each file.

Figure 4A:
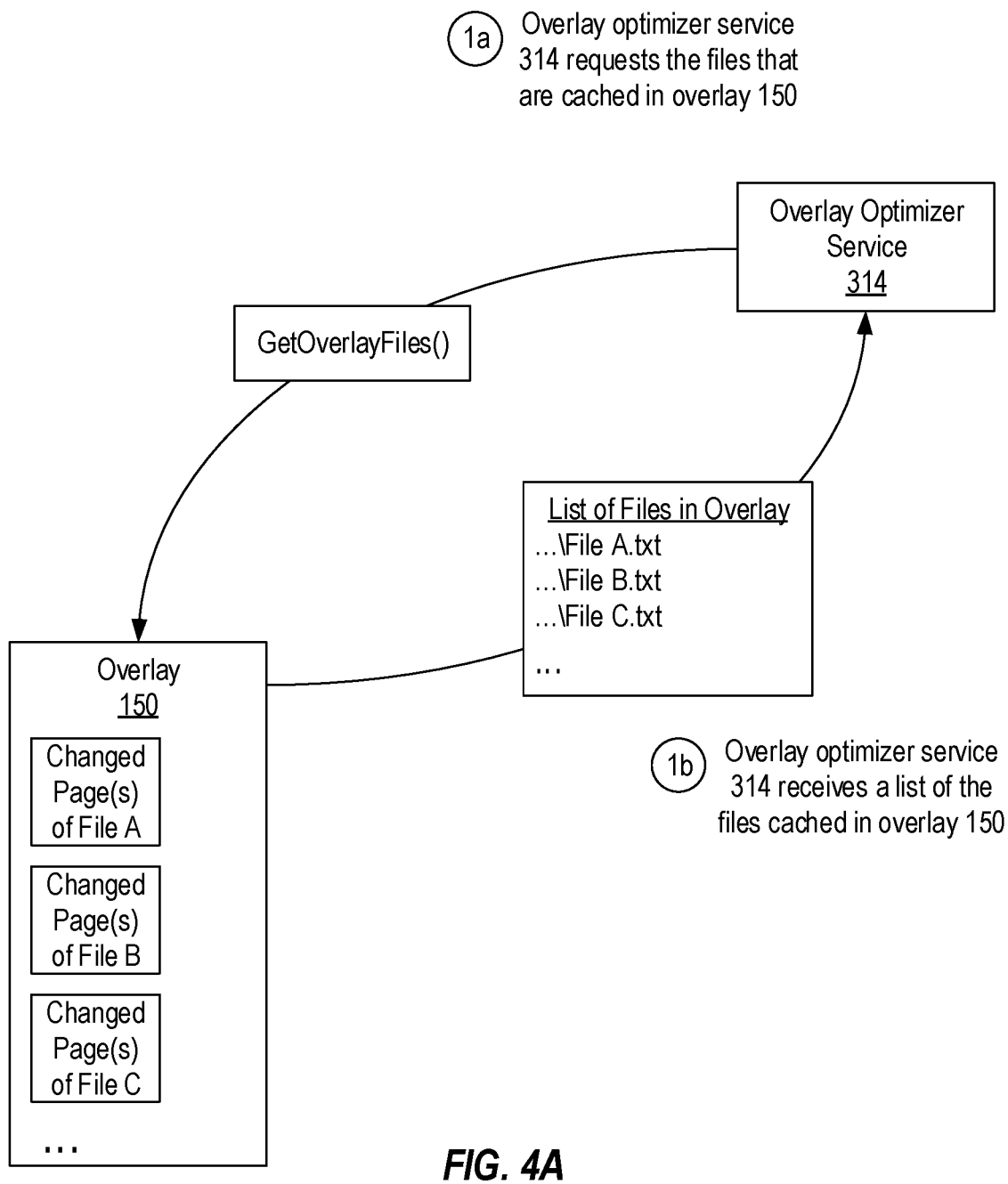
FIGS. 4A-4F illustrate functionality that the overlay optimizer can perform to identify the changed portions of files that are actually stored in the write filter's overlay to avoid having to copy the entire file to an overlay cache.
Figure 4B:
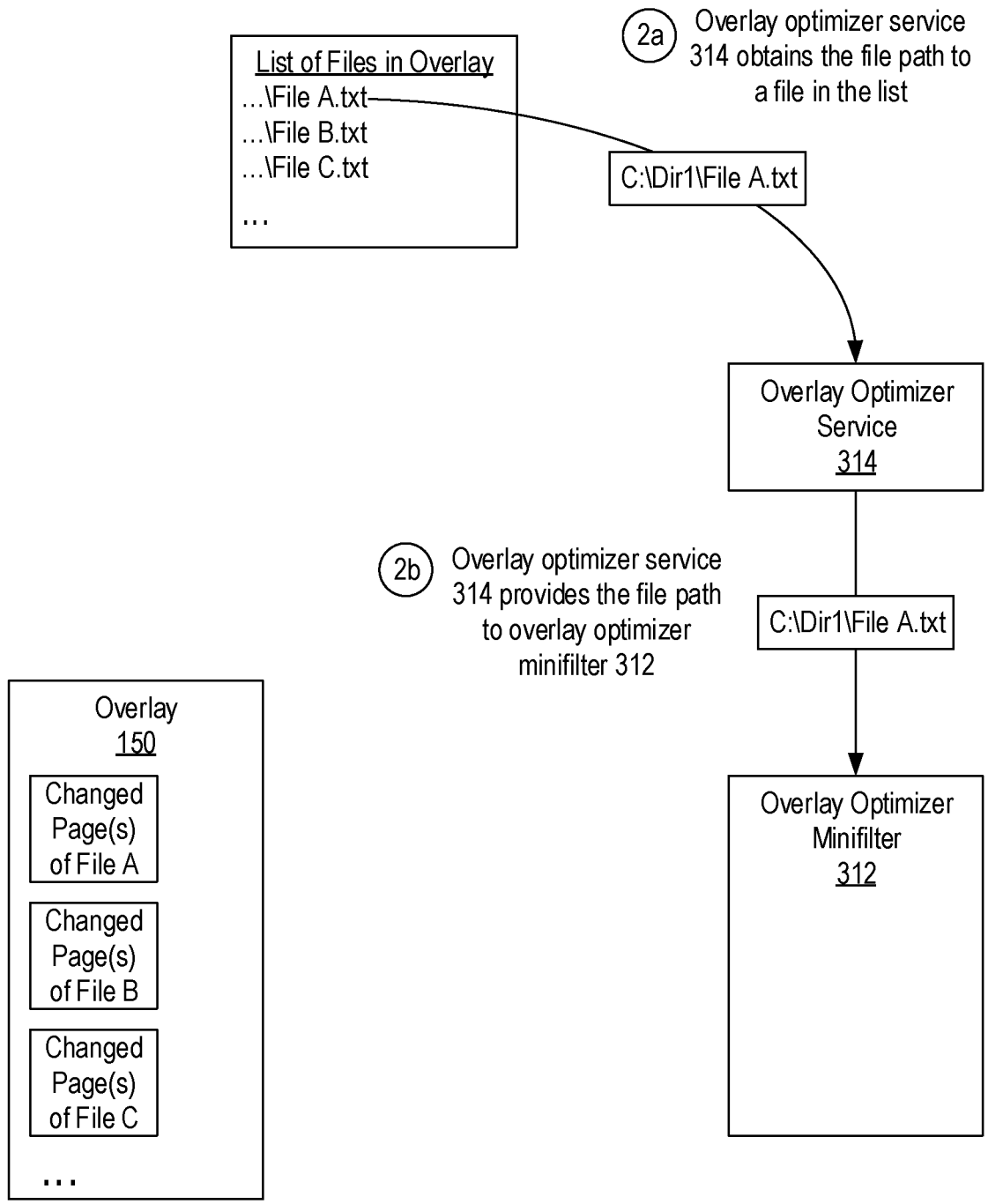

Turning to FIG. 4B, once overlay optimizer service 314 obtains the list of files, it can identify a particular file in the list in step 2a and send the filename of the file to overlay optimizer service 314 in step 2b. These steps can be repeated for each file in the list (or at least until the overlay's consumption has been reduced to a satisfactory level). As shown, this filename can be in the form of a complete file path to the file (which for File A is assumed to be C:\Dir1\File A.txt). In this way, overlay optimizer minifilter 312 becomes aware of a file that should be moved from overlay 150 to overlay cache 313.

Figure 4C:
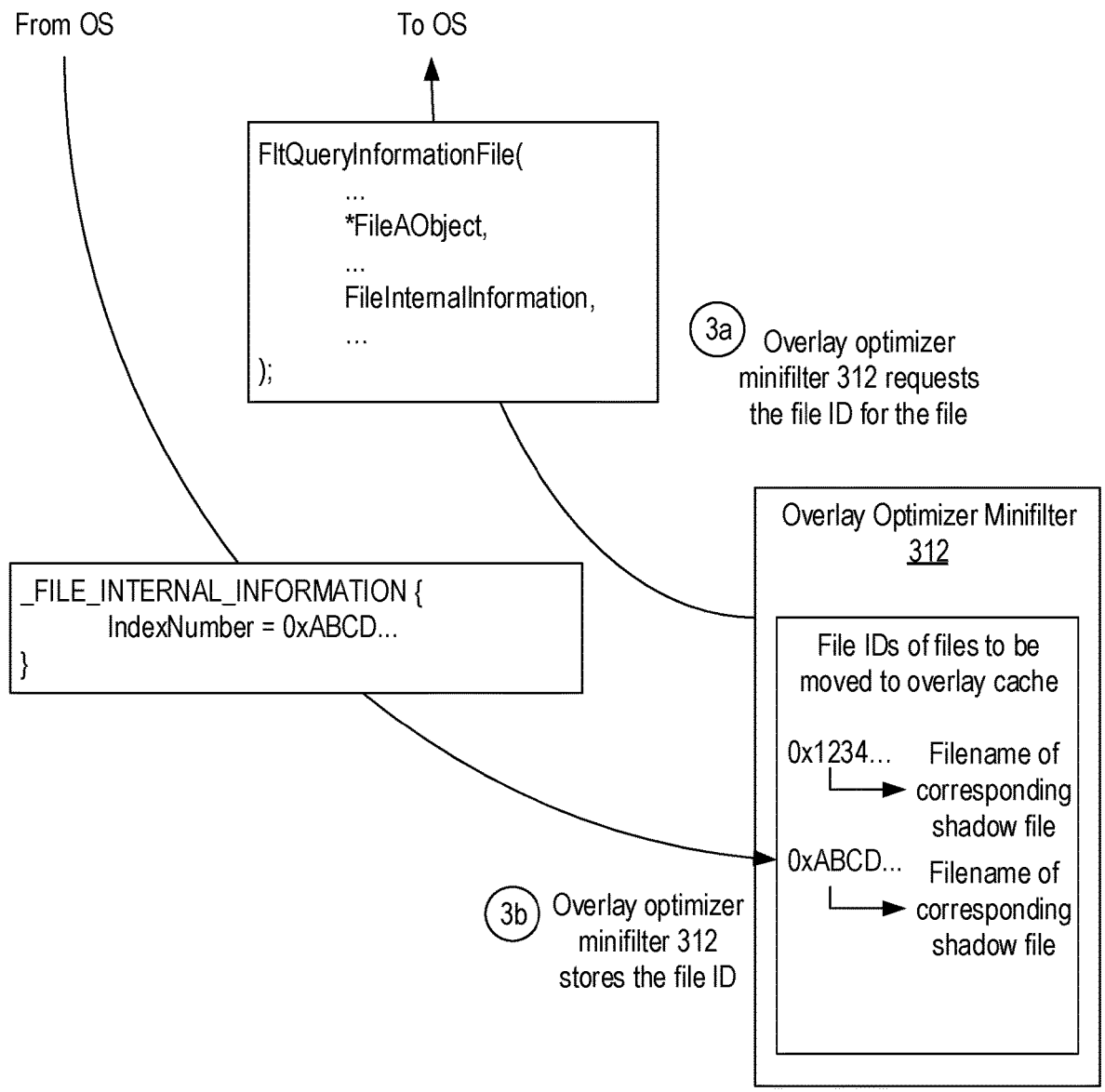

Once overlay optimizer minifilter 312 receives the filename of a file from overlay optimizer service 314, it can request a file ID for the file as represented as step 3a in FIG. 4C. For example, in Windows-based implementations, overlay optimizer minifilter 312 can employ the filename of File A to obtain a pointer to the file object for File A and can then call the FltQueryInformationFile function and provide as inputs the pointer to the file object for File A and FileInternalInformation as the FILE INFORMATION CLASS value. As a result, overlay optimizer minifilter 312 will receive back the file ID (or file reference number) as the value of the IndexNumber member of the FILE INTERNAL INFORMATION structure. This file ID is a unique 8 byte value assigned by the file system to represent the file. In step 3b, overlay optimizer minifilter 312 stores the file ID. Steps 3a and 3b can be performed for each filename that overlay optimizer minifilter 312 receives from overlay optimizer service 314 in step 2b. As a result, overlay optimizer minifilter 312 will have created a listing of file IDs for files that are to be moved from overlay 150 to overlay cache 313. As shown, in conjunction with obtaining the file ID of a file, overlay optimizer minifilter 312 can also create a shadow file in overlay cache 313 for the file and maintain a mapping between the file ID and the filename of the corresponding shadow file.

Figure 4D:
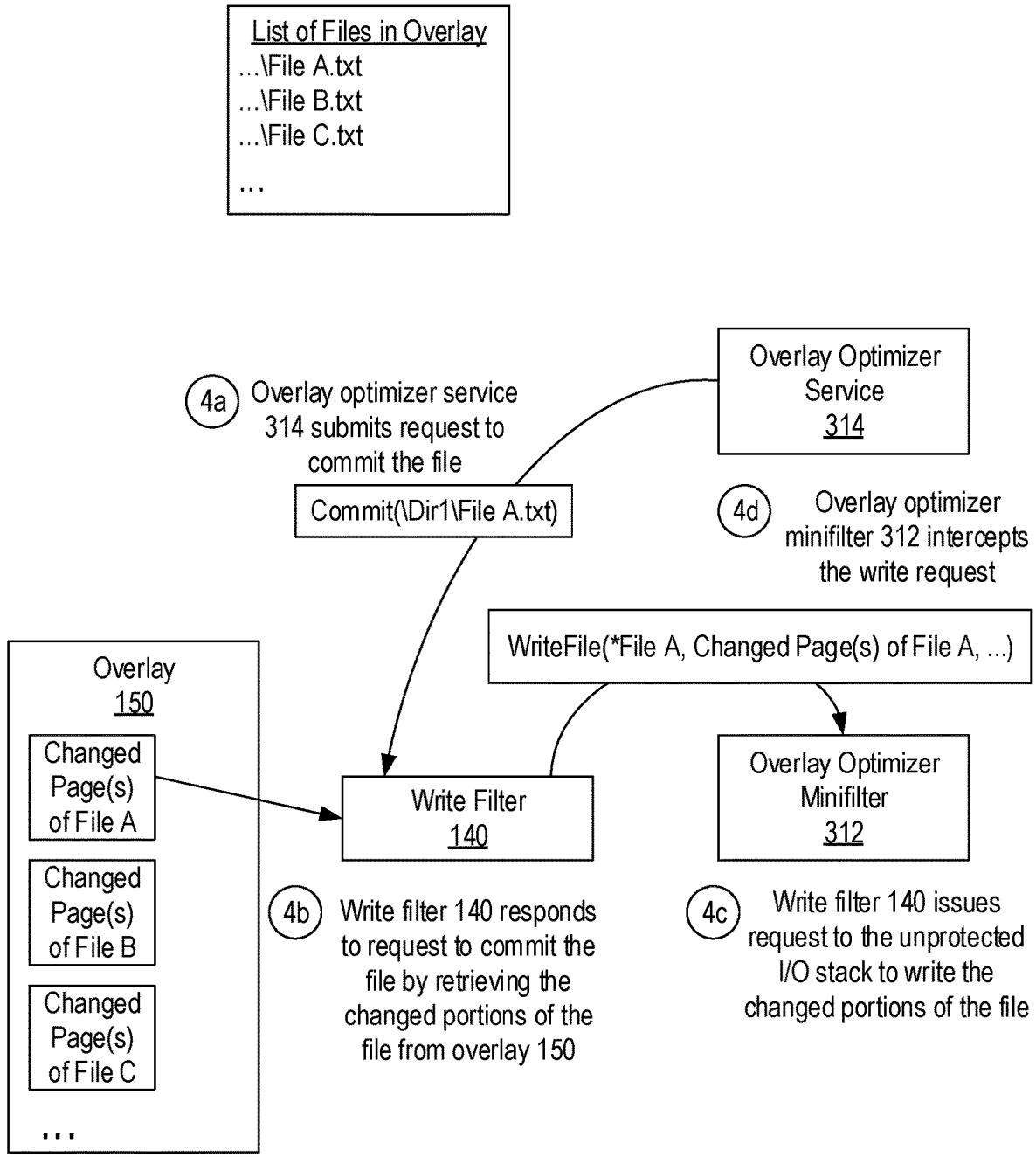

Once overlay optimizer service 314 notifies overlay optimizer minifilter 312 of each file that is to be moved from overlay 150, overlay optimizer service 314 can request that the files be committed as represented as step 4a in FIG. 4D. It is noted that, in normal operation, a request to commit a file from overlay 150 to the protected volume would cause the changed portions of the file to be written to the version of the file on the protected volume thereby permanently modifying the file. However, as will become apparent below, overlay optimizer minifilter 312 prevents this normal handling of a commit from being carried out for any file that overlay optimizer 310 is moving to overlay cache 313.

In response to overlay optimizer service 314's request to commit a file, write filter 140 will read the changed portions of the file in step 4b and issue a request to write the change portions in step 4c. As described in the background, this write request will be directed to the unprotected I/O stack.

Given that overlay optimizer minifilter 312 is loaded on the unprotected I/O stack, it will intercept this write request in step 4d. Steps 4a-4d can be performed for each file to be moved.

Figure 4E:
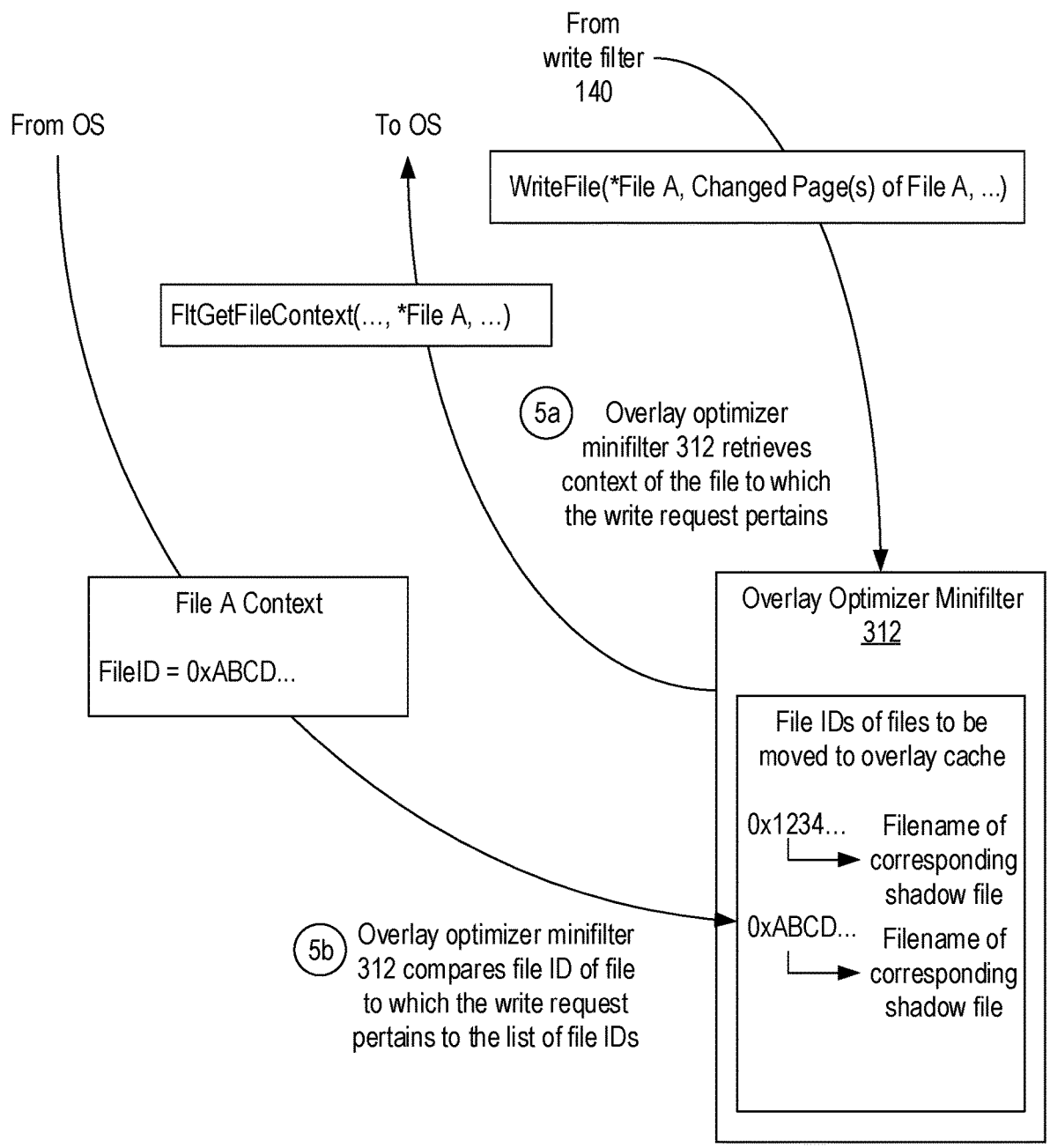

Turning to FIG. 4E, when overlay optimizer minifilter 312 intercepts a write request, it does not yet know whether the write request is a result of overlay optimizer service 314's request to commit a file or a result of some other function (e.g., a write to an excluded file/directory on the protected volume, a request to commit a file made by another service, etc.). Accordingly, whenever overlay optimizer minifilter 312 receives a write request, it can perform step 5a to retrieve the context of the file to which the write request pertains (e.g., by calling the FltGetFileContext function). In the depicted example, it is assumed that the received write request pertains to File A and therefore, overlay optimizer minifilter 312 will receive a file context that includes a file ID of 0xABCD . . . in response to its call to FltGetFileContext. Then, in step 5b, overlay optimizer minifilter 312 can compare the file ID retrieved in step 5a to its list of file IDs that it created in step 3b to thereby determine whether the current write request pertains to a file that overlay optimizer service 314 indicated that it would be committing. In the depicted example, overlay optimizer minifilter 312 will determine that the file ID obtained in step 5a (0xABCD . . . ) matches the file ID of File A (0xABCD . . . ) that it had previously stored in its list.

Although not shown, to ensure that the comparison in step 5b will be possible, in some embodiments, overlay optimizer minifilter 312 may retrieve the context of the file and verify that the context includes the file ID of the file. If not, overlay optimizer minifilter 312 could perform steps similar to steps 3a and 3b to retrieve the file ID and store it in the file's context. In this way, even if the creator of the write request did not create a file context that included the file ID, the file ID will be stored in the file context before step 5b is performed.

Using the file ID to identify write requests that are a result of overlay optimizer service 314's request to commit a file ensures that overlay optimizer minifilter 312 will detect such write requests regardless of how they are performed. For example, this technique will detect such writes even when the file is committed to disk via multiple handles or threads or when the file is opened via a short name or relative path.

Figure 4F:
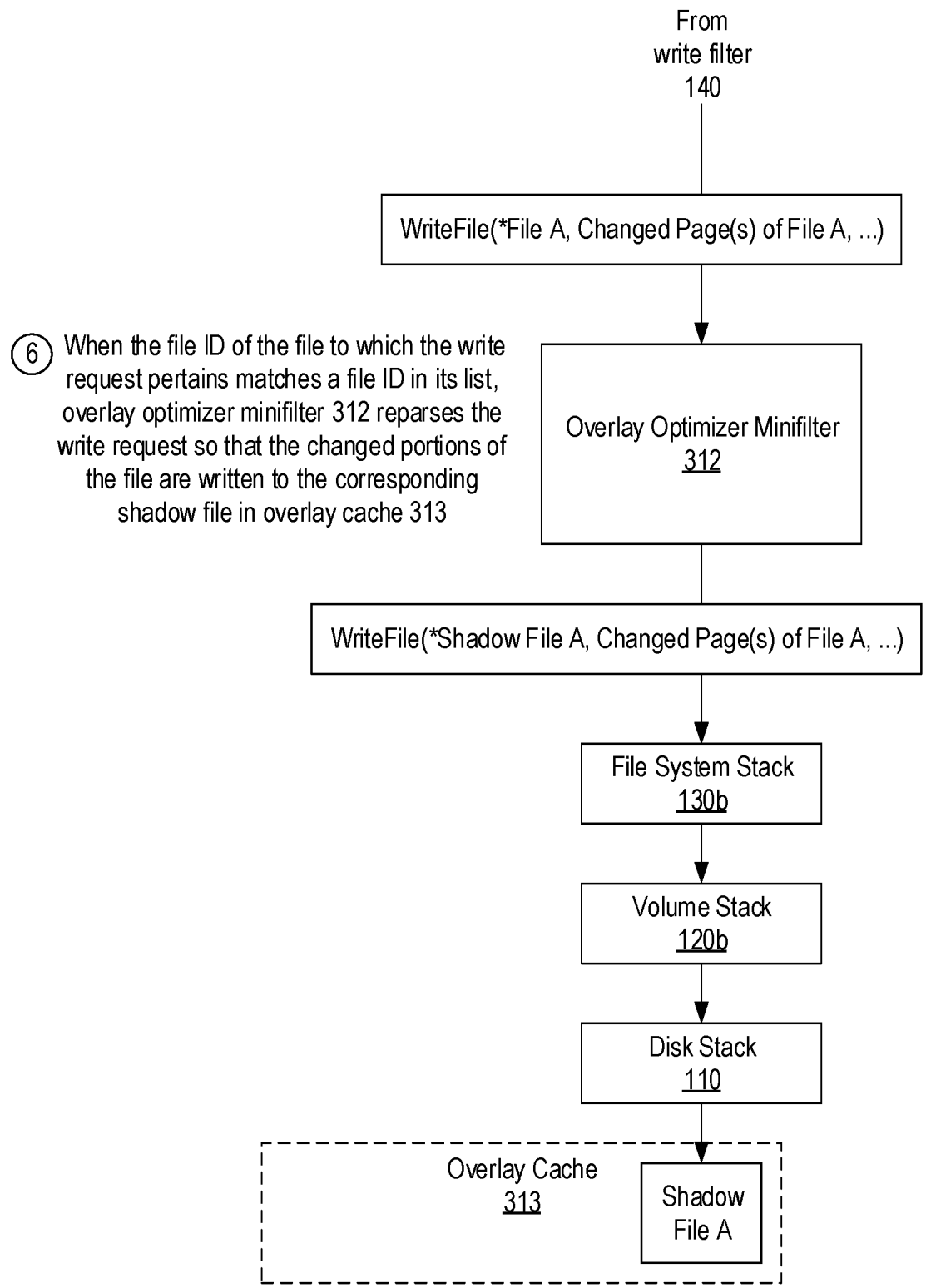

Step 6 in FIG. 4F represents how overlay optimizer minifilter 312 may reparse (or redirect) a write request when it determines that the write request is a result of overlay optimizer service 314's request to commit a file (i.e., when overlay optimizer minifilter 312 determines in step 5b that the file ID of the file to which the write request pertains matches a file ID contained in its list). Because overlay optimizer minifilter 312 has mapped the file ID to the filename of the corresponding shadow file in overlay cache 313, it can replace the filename that is currently associated with the write request with the filename of the corresponding shadow file.

For example, overlay optimizer minifilter 312 could call the IoReplaceFileObjectName function with inputs of the pointer to the file object for file A (which would be provided in the write request) and the filename of the corresponding shadow file. As represented in FIG. 4F, this will cause the write request to target the corresponding shadow file in overlay cache 313 rather than the actual file stored on the protected volume. In this way, the changed portions of the file will be stored in overlay cache 313 but will not be committed to the actual unmodified file that exists on the protected volume.

Although not shown, if overlay optimizer minifilter 312 determines in step 5b that the file ID of the file to which the write request pertains does not match a file ID contained in its list, it can simply allow the write request to be passed down the stack for normal handling. In short, overlay optimizer minifilter 312 will pass each write request down towards volume stack 120b but selectively modifies any write request that are determined to be a result of overlay optimizer service 314's request to commit a file cached in overlay 150.

When any write request that resulted from a request to commit a file is completed successfully (whether or not the commit request was issued by overlay optimizer service 314), write filter 140 will complete the commit by discarding the changed portions of the file from overlay 150. Accordingly, for a commit initiated by overlay optimizer service 314, the end result is that only the changed portions of the file are copied to overlay cache 313 (but are not actually committed to the corresponding file on the protected volume) and then the changed portions of the file are discarded from overlay 150 thereby reducing its consumption.

To ensure that the user will still see the changed file (i.e., to ensure that the file with the changed portions will still be presented to the user), overlay optimizer 310 can update a hash table or "map" that reflects that the changed portions to the file exist in overlay cache 313. The '940 Publication describes how an overlay optimizer can employ a map for this purpose and therefore the creation, update and use of a map will not be described in detail. Suffice it to say that overlay optimizer minifilter 311 can employ the map when handling an I/O request to determine whether content from overlay cache 313 needs to be accessed to complete the I/O request properly (e.g., by merging a file's changed pages stored in and retrieved from overlay cache 313 with the file's unmodified pages retrieved from the protected volume.

Figure 5A:
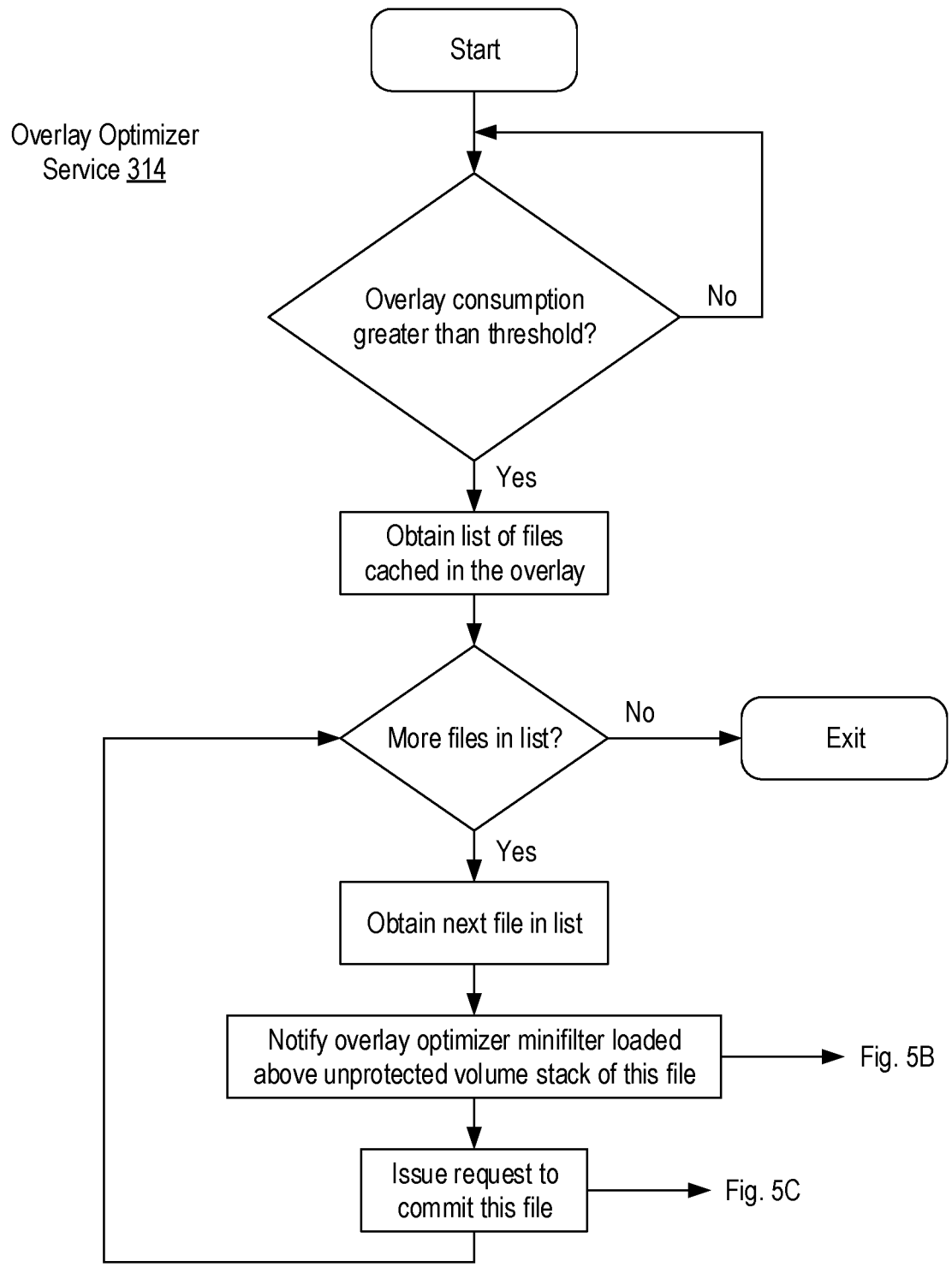
FIGS. 5A-5C provide flow diagrams representing functionality that the overlay optimizer can perform to identify the changed portions of files that are actually stored in the write filter's overlay to avoid having to copy the entire file to an overlay cache.
Figure 5B:
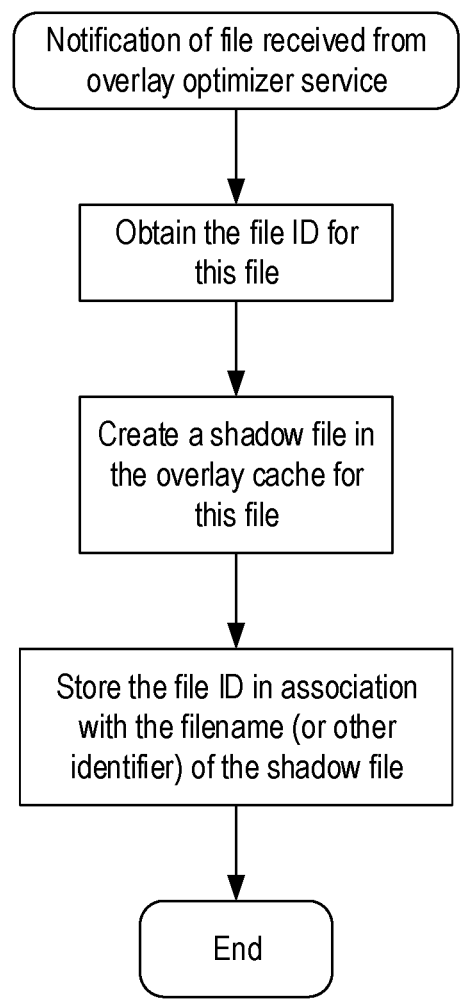
Figure 5C:
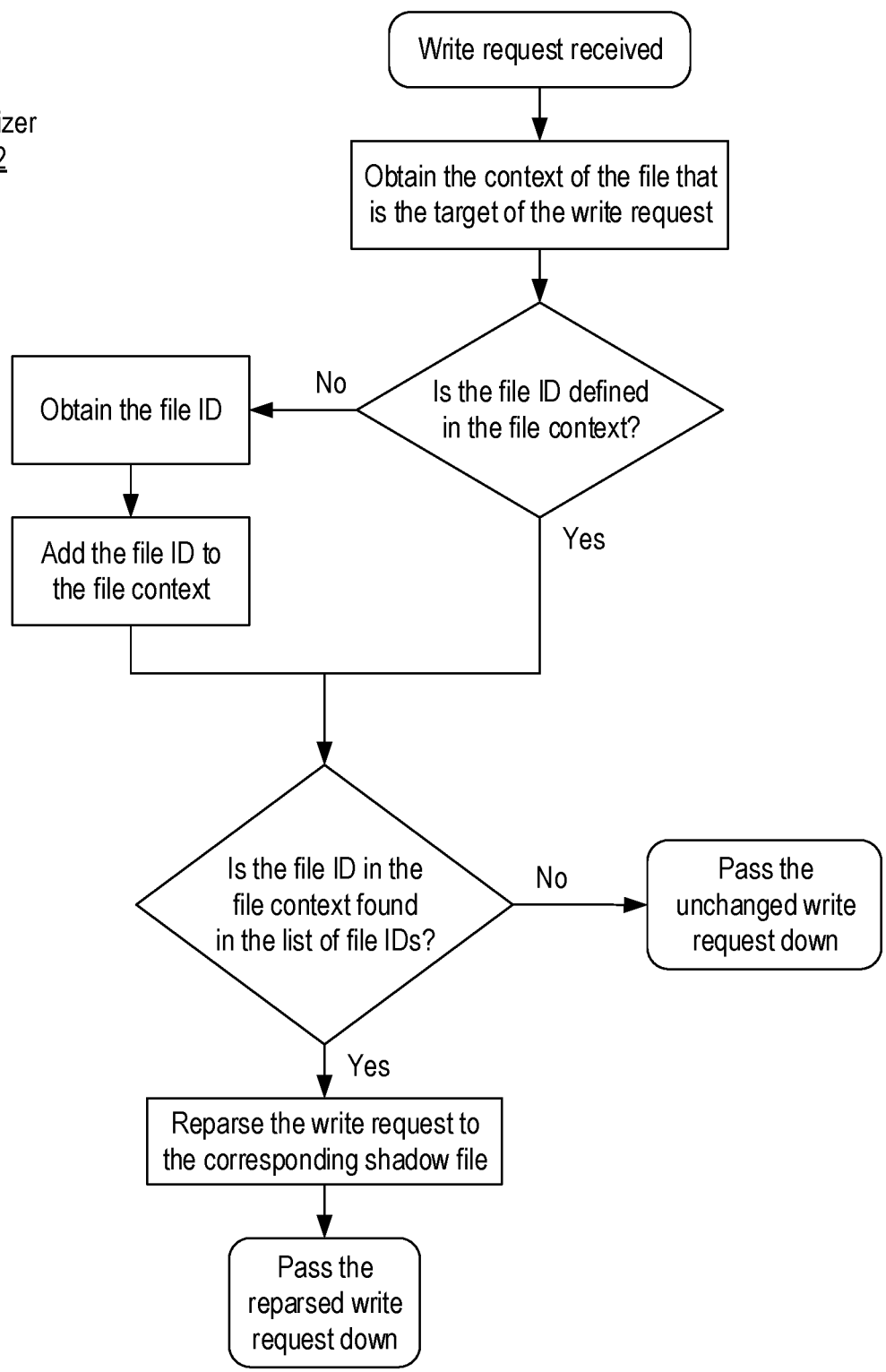

FIGS. 5A-5C provide flow diagrams corresponding to the above-described functionality. FIG. 5A represents functionality that overlay optimizer service 314 performs to determine when to initiate the process of freeing up overlay 150, to notify overlay optimizer minifilter 312 of the files that will be moved from overlay 150 and to initiate the process of moving the files. FIG. 5B represents functionality that overlay optimizer minifilter 312 performs when it receives a notification from overlay optimizer service 314 that a file will be moved from overlay 150. FIG. 5C represents functionality that overlay optimizer 313 performs when it receives an I/O request to determine whether the I/O request pertains to a commit initiated by overlay optimizer service 314, and if so, to reparse the I/O request to a corresponding shadow file in overlay cache 313.

In some embodiments, overlay optimizer 310 may also be configured to enable directory change notifications (DCNs) when the content of a directory is spread across more than one volume. For example, in architecture 300 shown in FIG. 3, the protected volume and overlay cache 313 may each store files (or portions of files) that exist (or are represented as existing) in the same directory. In this scenario, and with prior art techniques as described in detail in the background, when an application requests a DCN for changes to this directory, the request will only be provided to file system stack 130a, and therefore, any changes to the directory that are made through file system stack 130b will not trigger a DCN.

Figure 6:
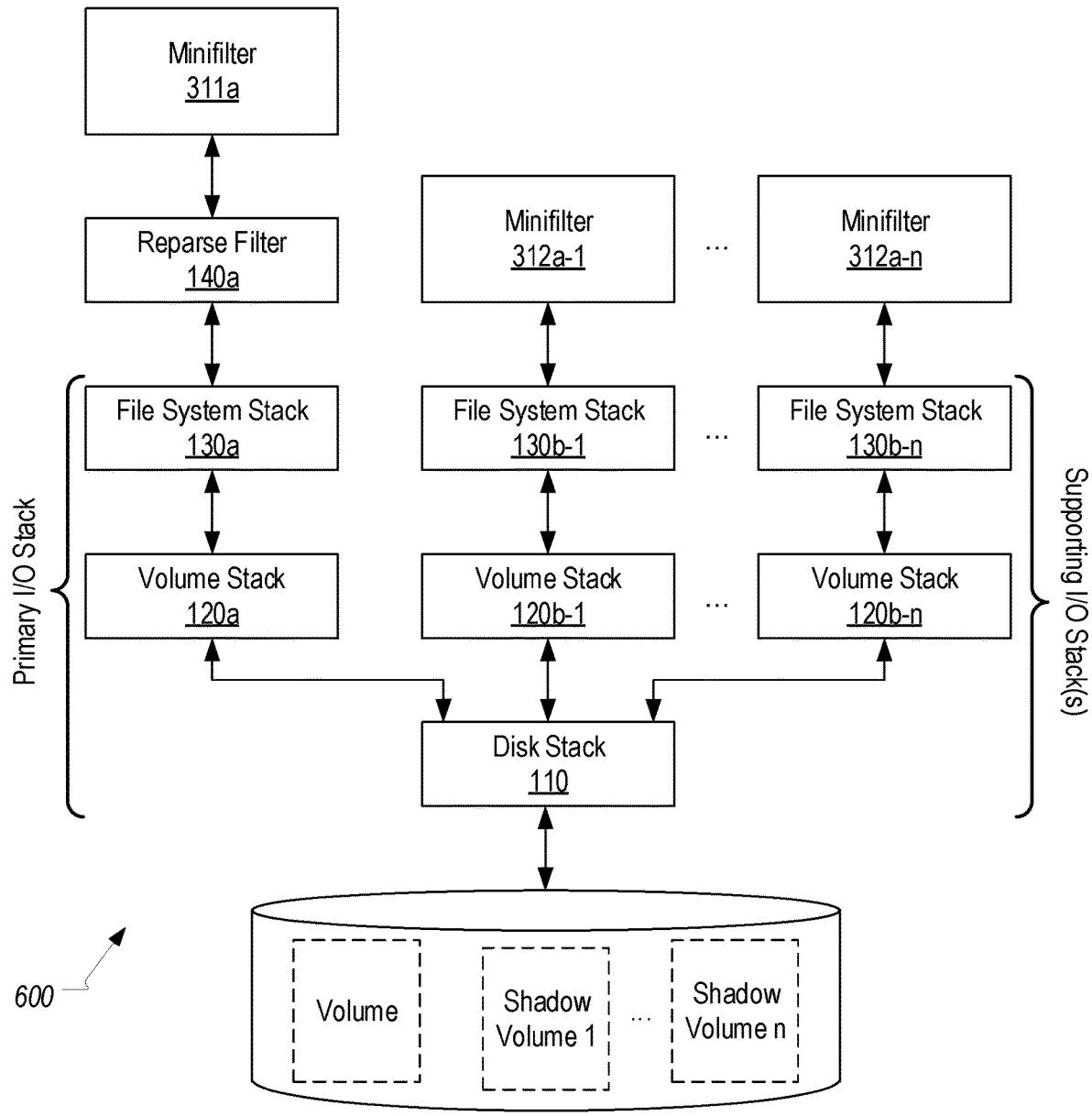
FIG. 6 illustrates an example multi-volume filter architecture in which embodiments of the present invention may be implemented.

This same problem exists in other multi-volume filter architectures. For example, FIG. 6 illustrates a multi-volume filter architecture 600 that is substantially the same as architecture 300 but more closely represents the architecture that would exist when a deduplication, mirroring or caching solution is implemented. As in architecture 300, a filter is loaded on the primary I/O stack in architecture 600. This filter is labeled and will be referred to as reparse filter 140a to indicate that it could represent write filter 140 or a file system filter of a deduplication, mirroring, caching or similar solution. As in architecture 300, a supporting I/O stack (which includes file system stack 130b-1 and volume stack 120b-1) will also exist in architecture 600 and corresponds with shadow volume 1. Architecture 600 may also include zero or more additional supporting I/O stacks which would include a file system stack 130b-n and a volume stack 120b-n and would correspond with shadow volume n (where n is intended to represent any reasonable integer including 0). In accordance with embodiments of the present invention, a minifilter 311a can be loaded on the primary I/O stack above reparse filter 140a and a minifilter (312a-1 through 312a-n) may be loaded on each supporting I/O stack above the file system driver. These minifilters may or may not be the same as the overlay optimizer minifilters described above.

FIGS. 7A-7F illustrate how a minifilter loaded on the primary I/O stack in a multi-volume filter environment can enable DCNs when a directory is spread across multiple volumes. For illustrative purposes, FIGS. 7A-7F will be based on architecture 300 and will show overlay optimizer minifilter 311 performing the functionality, but the depicted functionality can equally be performed in architecture 600 using minifilter 311a.

In FIGS. 7A-7F, it is assumed that the protected volume includes a directory, C:\Dir1, and that overlay optimizer 310 maintains a corresponding directory, D:\Dir1, in overlay cache 313 where modified files in Dir1 have been moved. For example, a file named File 2.txt is shown as being stored in overlay cache 313. As described above, File 2.txt could have originally been stored in overlay 150 (e.g., when File 2.txt was created or modified) but moved to overlay cache 313. As also described above, overlay optimizer 310 can maintain a map that defines that file 2.txt is actually part of C:\Dir1 (at least from the user's perspective). Of importance to the present discussion, if an application desires to be notified of changes to C:\Dir1, a DCN should be triggered whenever any changes are made to this directory on the protected volume as well as whenever any changes are made to the corresponding directory in overlay cache 313.

Figure 7A:
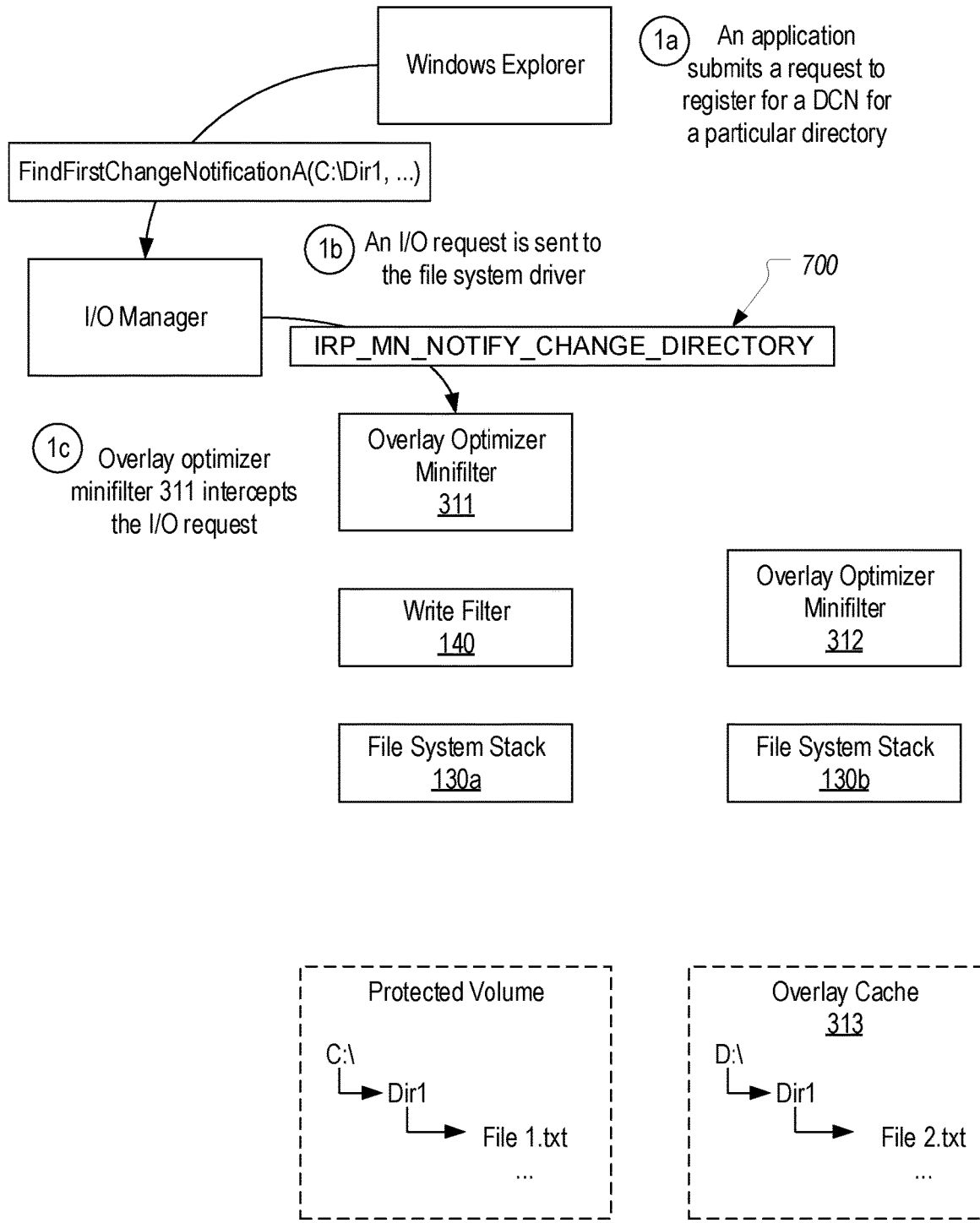
FIGS. 7A-7F illustrate functionality that a minifilter can perform to enable directory change notifications when a directory is spread across multiple volumes.

Turning to FIG. 7A, in step 1a, an application, which is assumed to be Windows Explorer in this example, submits a request to register for a DCN for C:\Dir1. In Windows-based implementations, this may be accomplished by calling the FindFirstChangeNotificationA function and specifying the full directory path as input. In response, the I/O manager of the operating system can generate an I/O request (or DCN request) 700 and send it to the file system driver in file system stack 130a. In Windows-based implementations, DCN request 700 may be in the form of an IRP_MN_NOTIFY_CHANGE_DIRECTORY request. Because it is loaded above file system stack 130a, in step 1c, overlay optimizer minifilter 311 will receive DCN request 700 before it reaches the file system driver.

Figure 7B:
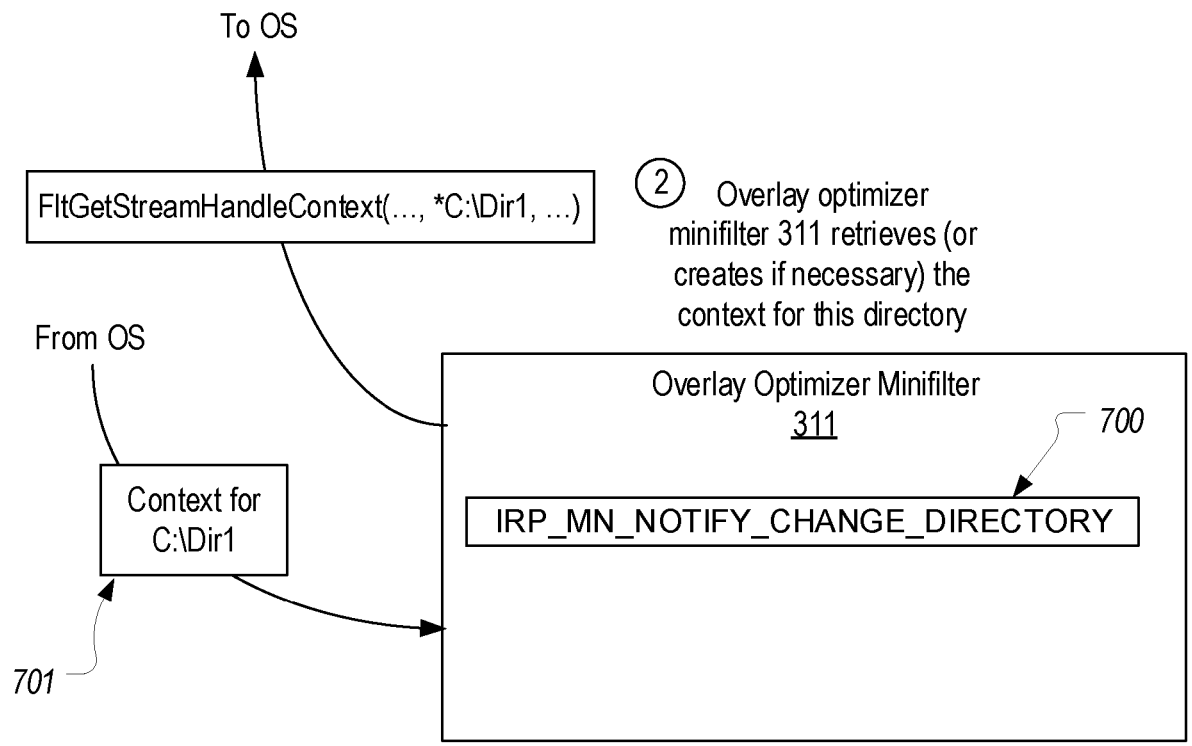

FIG. 7B illustrates the functionality that overlay optimizer minifilter 311 can perform when it receives DCN request 700 (e.g., as part of its pre-operation callback routine for IRP_MN_NOTIFY_CHANGE_DIRECTORY requests). In step 2a, overlay optimizer minifilter 311 can obtain a context for the directory identified in DCN request 700. For example, overlay optimizer minifilter 311 could call the FltGetStreamHandleContext (or similar) function and specify a pointer to the file object for C:\Dir1 as input (which pointer could be obtained from DCN request 700) to retrieve the context for C:\Dir1. Although not shown, a context may not have been created yet for C:\Dir1 in which case overlay optimizer minifilter 311 can create one (e.g., via a call to the FltAllocateContext function). For example, if DCN request 700 is a result of a call to the FindFirstChangeNotificationA function, it typically would not yet have a context. In contrast, if I/O request 700 were a result of a call to the FindNextChangeNotification function, it typically would have a context since calls to this function reuse the handle obtained by calling FindFirstChangeNotificationA. In any case, after performing step 2, overlay optimizer minifilter 311 will have obtained a context 701 for the directory that is the target of DCN request 700.

Figure 7C:
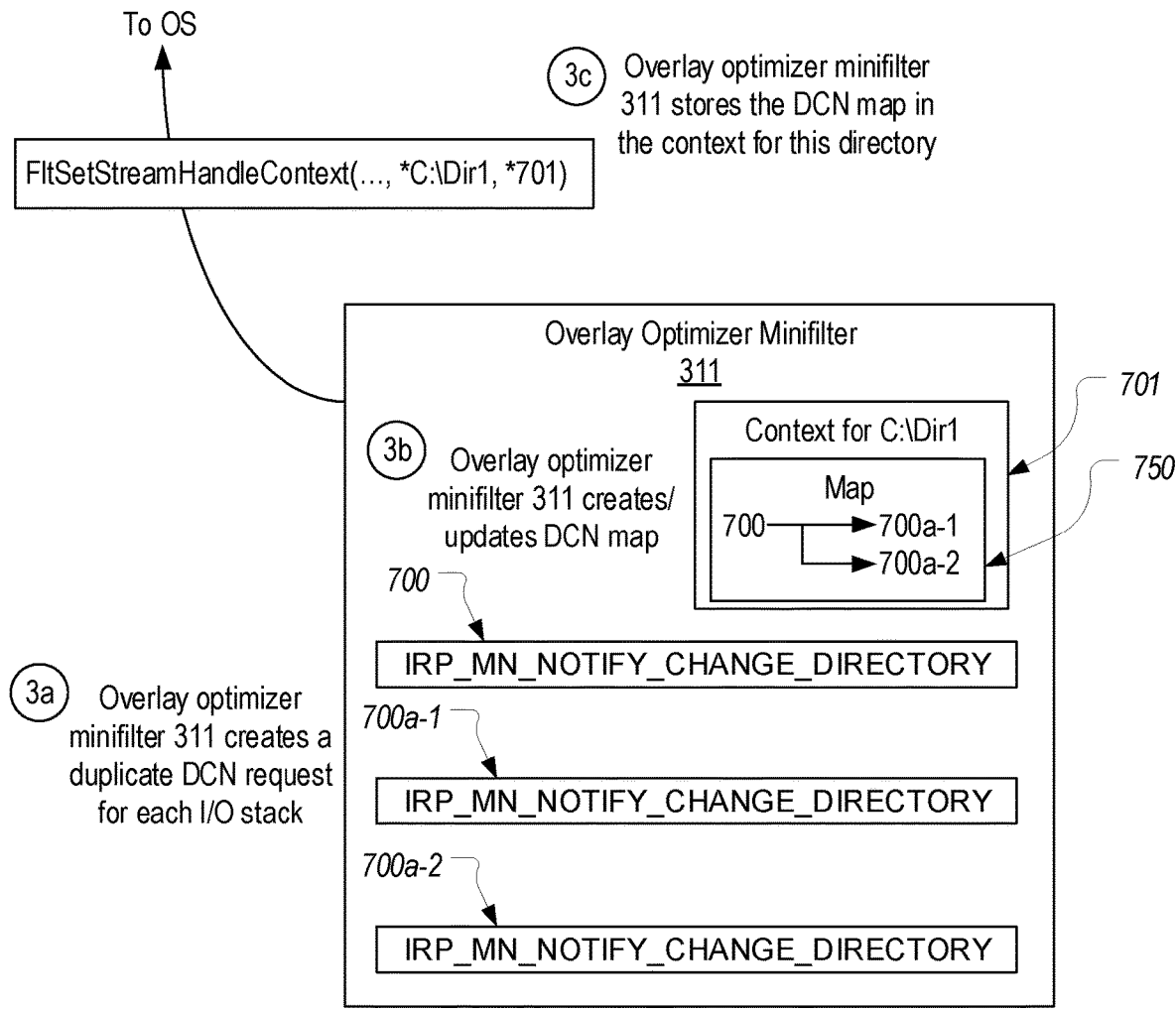

FIG. 7C illustrates how overlay optimizer minifilter 311 can create a duplicate DCN request 700a-1 through 700a-n (or collectively 700a) for each I/O stack and employ context 701 to maintain a DCN map 750 that links DCN request 700 with each duplicate DCN request 700a. As represented by step 3a, overlay optimizer minifilter 311 can create a duplicate DCN request 700a-1 to be sent to the file system driver in file system stack 130a and a duplicate DCN request 700a-2 to be sent to the file system driver in file system stack 130b. Each duplicate DCN request 700a can specify the same changes as DCN request 700. Overlay optimizer minifilter 311 can also configure each duplicate DCN request 700a so that it targets the appropriate directory. For example, DCN request 700a-1 can target the same directory, C:\Dir1, as DCN request 700, but DCN request 700a-2 will need to target the corresponding directory D:\Dir1 on overlay cache 313. In this way, duplicate DCN request 700a-1 will cause the file system driver in file system stack 130a to generate a DCN when a specified change occurs to C:\Dir1 while duplicate DCN request 700a-2 will cause the file system driver in file system stack 130b to generate a DCN when a specified change occurs to D:\Dir1.

In step 3b, overlay optimizer minifilter 311 can create or update map 750 to link DCN request 700 to each duplicate DCN request 700a. Any suitable technique can be employed to create such links including by mapping an identifier of DCN request 700 to an identifier of each duplicate DCN request 700a. In step 3c, overlay optimizer minifilter 311 can store DCN map 750 in the context of the file object for C:\Dir1. For example, overlay optimizer minifilter 311 may call FltSetStreamHandleContext and provide as inputs a pointer to the file object for C:\Dir1 and a pointer to context 701 which contains map 750.

Figure 7D:
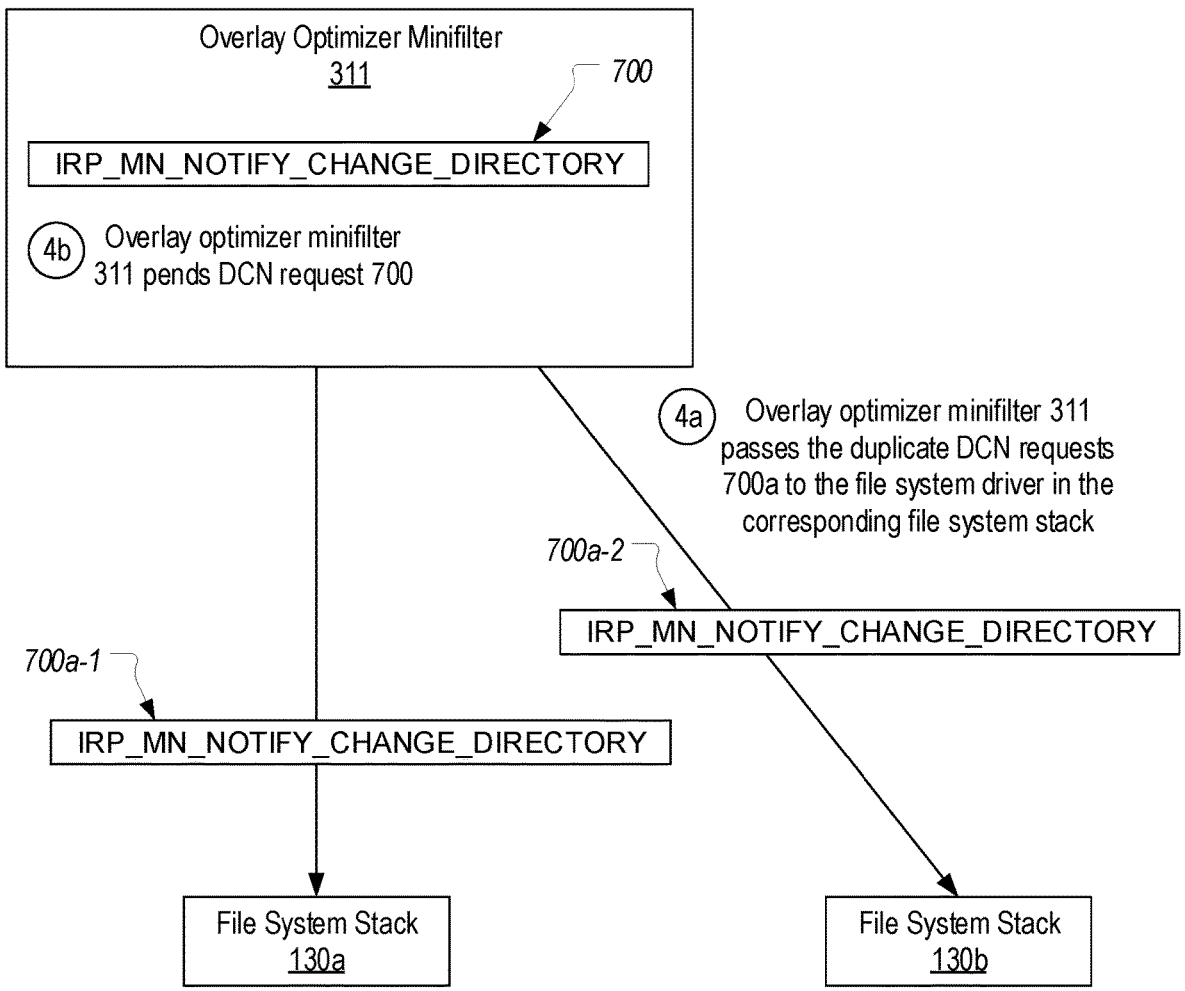

Turning to FIG. 7D, in step 4a, overlay optimizer minifilter 311 passes the duplicate DCN requests 700a down to the file system driver in the corresponding file system stacks. This can be accomplished using asynchronous I/O such as by calling the FltPerformAsynchronousIo function. As part of passing duplicate DCN requests 700a to the respective file system driver, overlay optimizer minifilter 311 can set context 701 containing DCN map 750 as the callback context for the asynchronous I/O request (e.g., by passing a pointer to context 701 to the FltPerformAsynchronousIo function). Including DCN map 750 in the callback context ensures that overlay optimizer minifilter 311 will have access to DCN map 750 when a duplicate DCN request 700a is completed. In this example, duplicate DCN request 700a-1 will be passed to the file system driver in file system stack 130a and duplicate DCN request 700a-2 will be passed to the file system driver in file system stack 130b. The file system drivers will handle the duplicate DCN requests 700a in a manner similar to how they handle any DCN request (i.e., they will complete the DCN request when any of the specified changes occur to the specified directory). In step 4b, overlay optimizer minifilter 311 pends DCN request 700 (e.g., by returning FLT_PREOP_PENDING from its pre-operation callback routine). While DCN request 700 is pended, overlay optimizer minifilter 311 can wait for the completion of any of the duplicate DCN requests 700a.

Figure 7E:
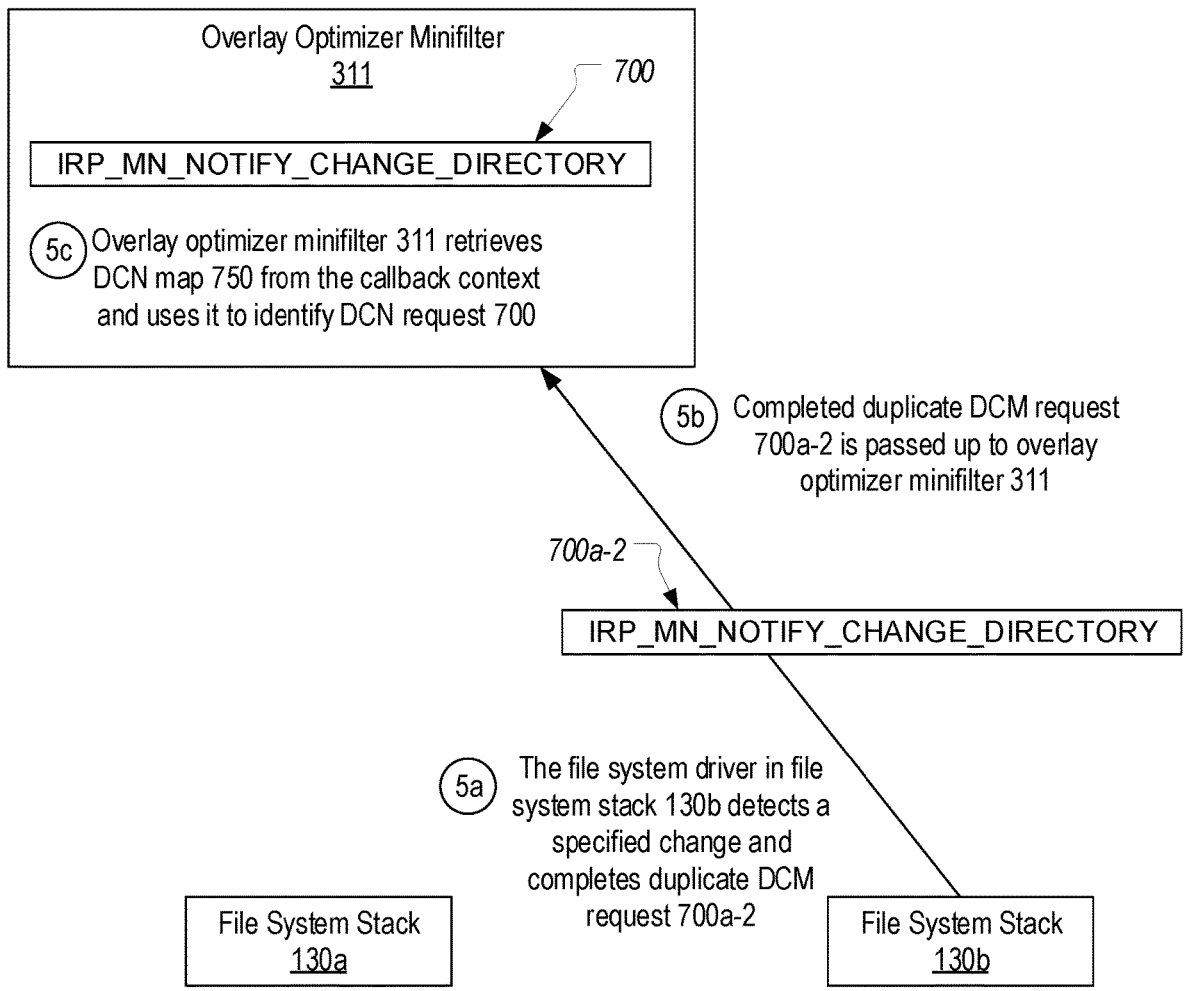
Figure 7F:
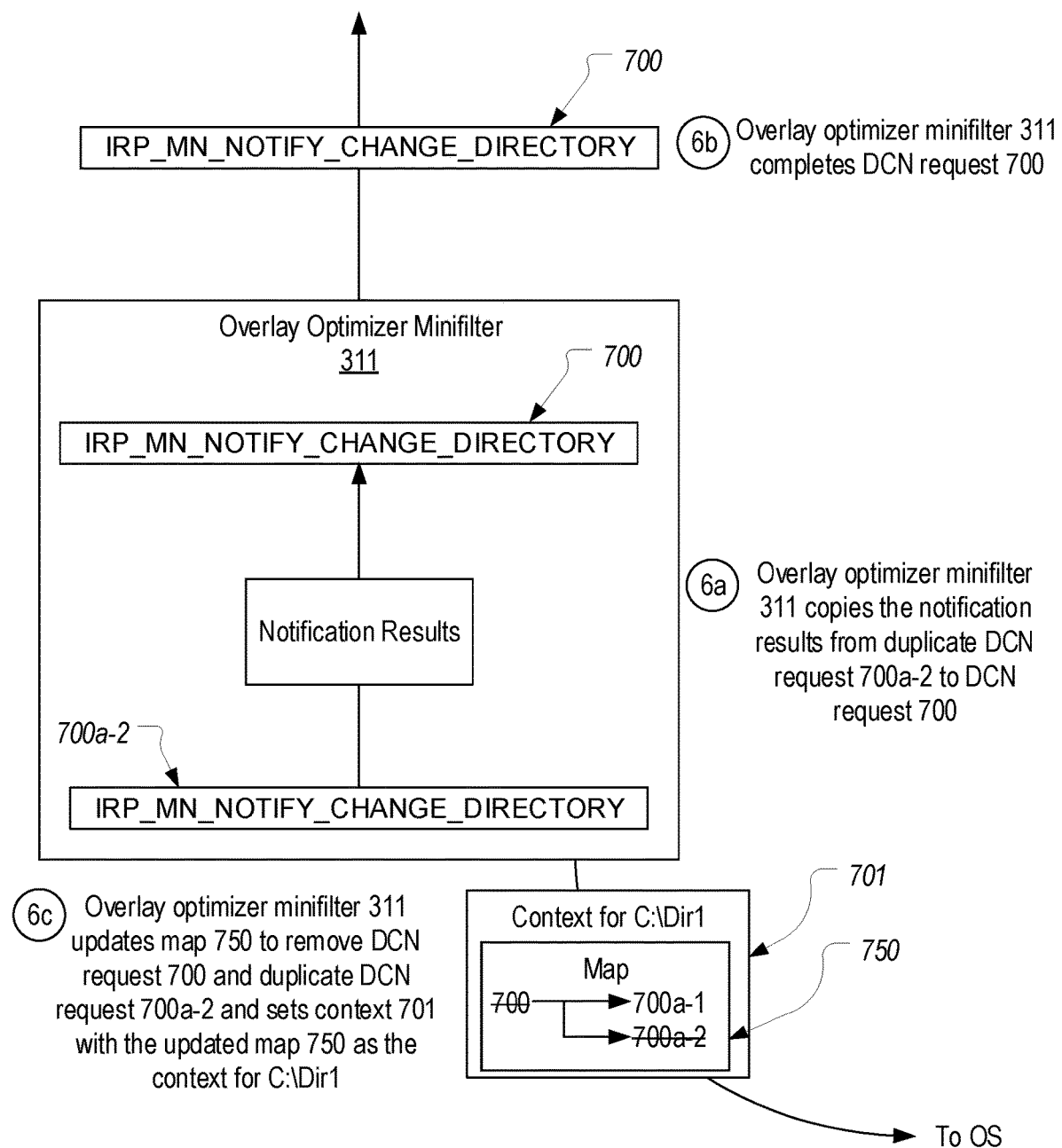

FIG. 7E illustrates the functionality that is performed when a file system driver completes one of the duplicate DCN requests 700a. In step 5a, it is assumed that the file system driver in file system stack 130b detects a specified change to D:\Dir1 and therefore completes duplicate DCM request 700a-2. In response, overlay optimizer minifilter 311 will receive the completed duplicate DCM request 700a-2. Because duplicate DCM request 700a-2 was passed down using asynchronous I/O, duplicate DCM request 700a-2 will be passed up to overlay optimizer minifilter 311 by calling overlay optimizer minifilter 311's callback routine. This call to overlay optimizer minifilter 311's callback routine will specify the callback context that overlay optimizer minifilter 311 set when it called the FltPerformAsynchronousIo function. In other words, the call to the callback routine will provide a pointer to context 701 which contains map 750.

In step 5c, overlay optimizer minifilter 311 can retrieve map 750 from the callback context and use it to identify DCN request 700 as the DCN request to which duplicate DCN request 700a-2 is mapped. It is noted that, at any given time, overlay optimizer minifilter 311 may be managing many DCN requests pertaining to many different directories. The use of DCN maps therefore enables overlay optimizer minifilter 311 to identify to which pended DCN request any given completed duplicate DCN request pertains.

In step 6a shown in FIG. 7E, overlay optimizer minifilter 311 copies the notification results from duplicate DCN request 700a-2 to DCN request 700. The notification results are populated by the file system driver into duplicate DCN request 700a-2's completion buffer and identify which change occurred to the directory. Once the notification results are copied to DCN request 700, overlay optimizer minifilter 311 completes DCN request 700 which will cause the DCN to be provided to the requesting application, Windows Explorer. In step 6c, overlay optimizer minifilter 311 updates map 750 to remove DCN request 700 and duplicate DCN requests 700a-2 and sets context 701 as the context for C:\Dir1. This ensures that if another duplicate DCN request 700a is subsequently completed, overlay optimizer minifilter 311 will be able to determine from map 750 that DCN request 700 has already been completed. Additionally, by maintaining map 750 in context 701, it can be reused when/if another DCN request targeting C:\Dir1 is received (e.g., if Windows Explorer immediately calls FindNextChangeNotification which would typically be the case).

In some embodiments, when one duplicate DCN request 700a is completed, overlay optimizer minifilter 311 can leave the remaining duplicate DCN request(s) 700a pending so that they need not be recreated if/when another DCN request is received for the same directory. For example, in the example shown in FIG. 7A-7F, overlay optimizer 311 can leave duplicate DCN request 700a-1 pending after it completes DCN request 700. Then, if another DCN request is received that targets C:\Dir1, in this subsequent iteration of step 3a and 3b, overlay optimizer minifilter 311 will only need to create a duplicate DCN request to send to file system stack 130b and can update map 750 to link both duplicate DCN request 700a-1 and the newly created duplicate DCN request to the newly received DCN request.

Figure 8A:
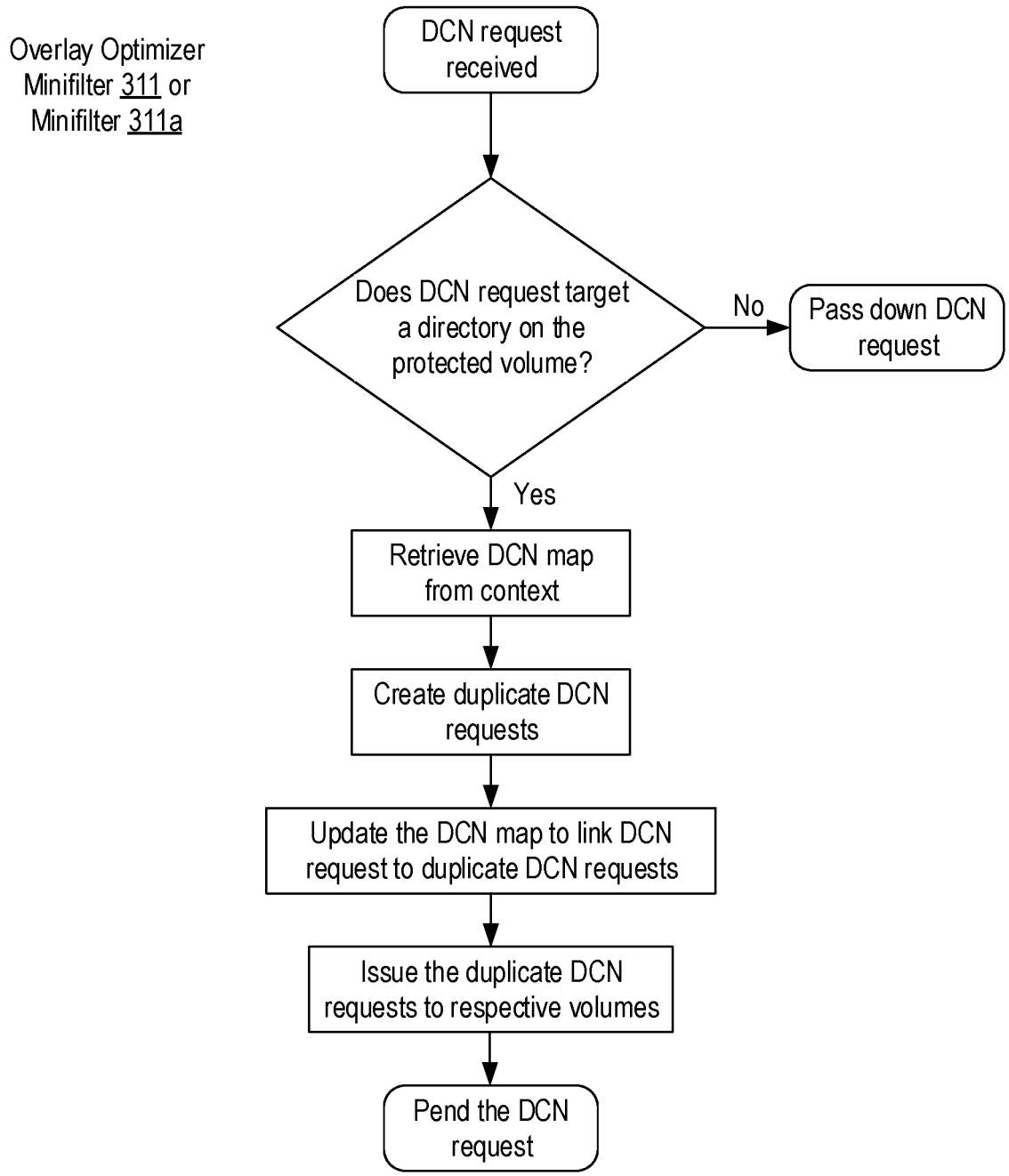
FIGS. 8A and 8B provide flow diagrams representing functionality that a minifilter can perform to enable directory change notifications when a directory is spread across multiple volumes.
Figure 8B:
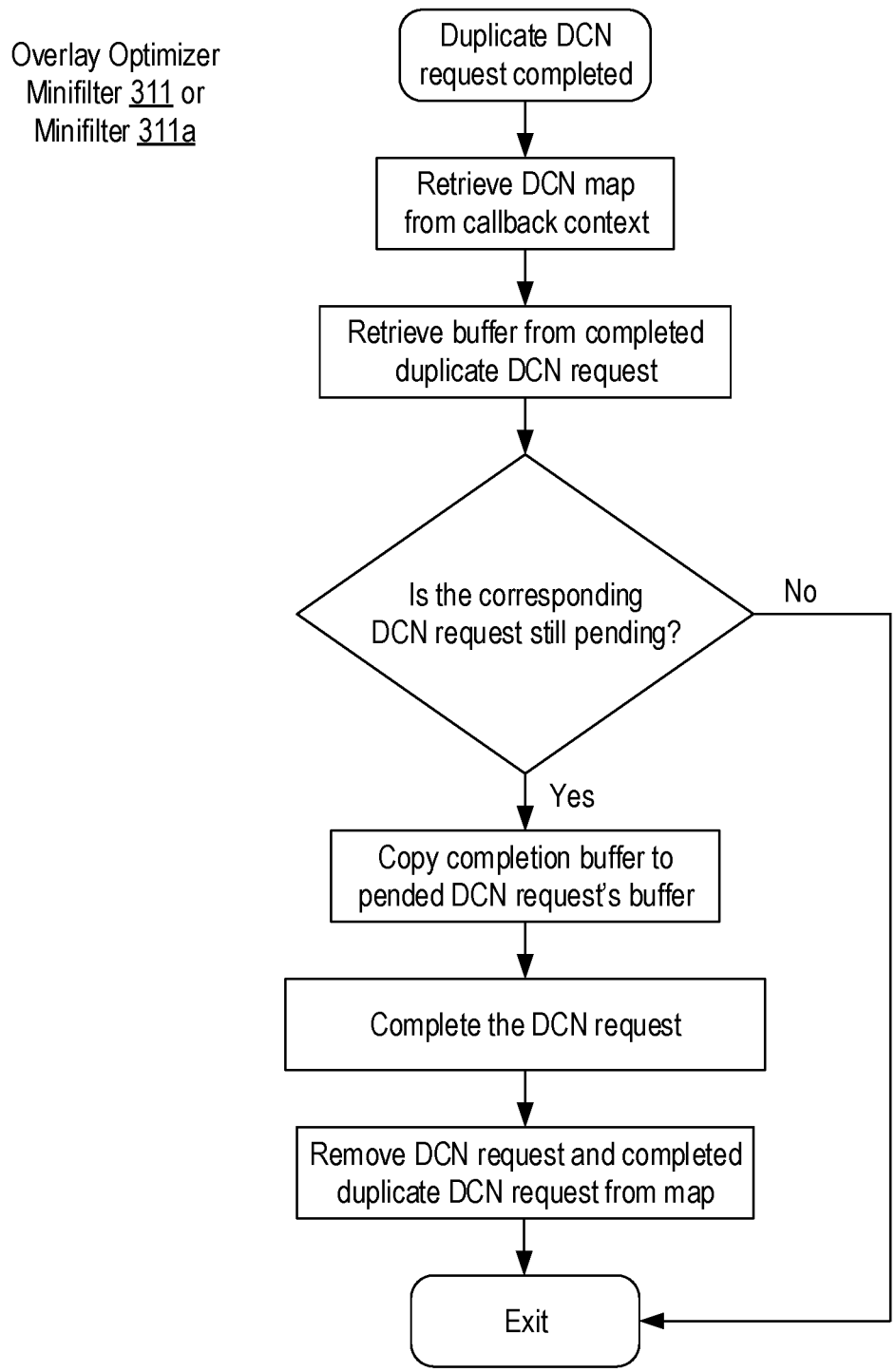

FIGS. 8A and 8B provide flowcharts which correspond with the above-described DCN functionality. FIG. 8A represents functionality that overlay optimizer minifilter 311 (or minifilter 311a) can perform as part of its pre-operation callback routine for IRP_MN_NOTIFY_CHANGE_DIRECTORY requests. FIG. 8B represents functionality that overlay optimizer minifilter 311 (or minifilter 311a) can perform as part of its asynchronous I/O callback routine when a duplicate DCN request is completed. To summarize, the above-described DCN functionality can be implemented to ensure that applications that rely on DCNs will function properly even when overlay optimizer 310 is used or deduplication, mirroring, caching etc. are implemented.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay optimizer that includes an overlay optimizer service, a first overlay optimizer minifilter that is loaded on a protected I/O stack and a second overlay optimizer minifilter that is loaded on an unprotected I/O stack, for minimizing an amount of data that is written to disk when the overlay optimizer service reduces consumption of the write filter's overlay, the method comprising:
   identifying, by the overlay optimizer service, a first file that is cached in the overlay;
   sending, by the overlay optimizer service, a first notification to the second overlay optimizer minifilter, the first notification identifying the first file;
   submitting, by the overlay optimizer service, a request to commit the first file;
   intercepting, by the second overlay optimizer minifilter, a write request that is being passed down the unprotected I/O stack;
   based on the first notification, determining, by the second overlay optimizer minifilter, that the write request pertains to the request to commit the first file; and
   reparsing, by the second overlay optimizer minifilter, the write request to an overlay cache.

2. The method of claim 1, further comprising:
   using, by the second overlay optimizer minifilter, content of the first notification to retrieve a file ID of the first file.

3. The method of claim 2, further comprising:
   retrieving, by the second overlay optimizer minifilter, a file ID of a file that the write request targets;
   wherein determining that the write request pertains to the request to commit the first file comprises comparing, by the second overlay optimizer minifilter, the file ID of the file that the write request targets to the file ID of the first file to determine that the file that the write request targets is the first file.

4. The method of claim 2, wherein the first notification identifies the first file by providing a full path of the first file, and wherein the file ID of the first file is retrieved using the full path of the first file.

5. The method of claim 2, further comprising:
   in conjunction with retrieving the file ID of the first file, creating, by the second overlay optimizer minifilter, a first shadow file in the overlay cache.

6. The method of claim 5, wherein reparsing the write request to the overlay cache comprises redirecting the write request to the first shadow file such that content of the write request is written to the first shadow file.

7. The method of claim 5, further comprising:
   associating, by the second overlay optimizer minifilter, the file ID of the first file with the first shadow file.

8. The method of claim 1, wherein the overlay optimizer service identifies a plurality of files that are cached in the overlay and sends one or more notifications to the second overlay optimizer minifilter that identify the plurality of files, the method further comprising:
   submitting, by the overlay optimizer service, requests to commit the plurality of files;
   intercepting, by the second overlay optimizer minifilter, a second write request that is being passed down the unprotected I/O stack;
   based on the one or more notifications, determining, by the second overlay optimizer minifilter, that the second write request does not pertain to any of the requests to commit the plurality of files; and
   passing, by the second overlay optimizer minifilter, the second write request down the unprotected I/O stack without reparsing the second write request.

9. The method of claim 1, further comprising:
   receiving, at the first overlay optimizer minifilter, a directory change notification (DCN) request that targets a first directory;
   creating, by the first overlay optimizer minifilter, a first duplicate DCN request and a second duplicate DCN request;
   maintaining, by the first overlay optimizer minifilter, a DCN map that associates the DCN request with the first and second duplicate DCN requests;
   sending, by the first overlay optimizer minifilter, the first duplicate DCN request down the protected I/O stack and the second duplicate DCN request down the unprotected I/O stack;
   pending, by the first overlay optimizer minifilter, the DCN request;
   in response to either the first or second duplicate DCN request being completed, employing, by the first overlay optimizer minifilter, the DCN map to determine that the completed duplicate DCN request is associated with the DCN request;
   copying, by the first overlay optimizer minifilter, content of the completed duplicate DCN request to the DCN request; and
   completing, by the first overlay optimizer minifilter, the DCN request.

10. The method of claim 9, wherein the DCN map is maintained in a context associated with the first directory.

11. The method of claim 9, wherein sending the first duplicate DCN request down the protected I/O stack and the second duplicate DCN request down the unprotected I/O stack comprises including the DCN map in a callback context.

12. The method of claim 9, further comprising:
   updating, by the first overlay optimizer minifilter, the DCN map to remove the association between the DCN request and the first and second duplicate DCN requests.

13. A method, performed by a minifilter in a multi-volume filter environment, for enabling directory change notifications when a directory spans the multiple volumes, the method comprising:
   receiving a directory change notification (DCN) request that targets a first directory;
   creating a plurality of duplicate DCN requests corresponding to a plurality of I/O stacks;
   sending each of the plurality of duplicate DCN requests down the corresponding I/O stack;
   pending the DCN request;
   in response to any of the plurality of duplicate DCN requests being completed, copying content of the completed duplicate DCN request to the DCN request; and
   completing the DCN request.

14. The method of claim 13, further comprising:
   maintaining a DCN map that associates the DCN request with each of the plurality of duplicate DCN requests; and
   employing the DCN map to determine that the completed duplicate DCN request is associated with the DCN request.

15. The method of claim 14, further comprising:
storing the DCN map in a context associated with the first directory.

16. The method of claim 14, wherein sending each of the plurality of duplicate DCN requests down the corresponding I/O stack comprises including the DCN map in a callback context.

17. One or more computer storage media storing computer executable instructions which when executed on a computing device that includes a write filter implement an overlay optimizer that includes an overlay optimizer service, a first overlay optimizer minifilter that is loaded on a protected I/O stack and a second overlay optimizer minifilter that is loaded on an unprotected I/O stack, the overlay optimizer being configured to perform a method for minimizing an amount of data that is written to disk when the overlay optimizer reduces consumption of the write filter's overlay, the method comprising:
identifying, by the overlay optimizer service, a first file that is cached in the overlay;
sending, by the overlay optimizer service, a first notification to the second overlay optimizer minifilter, the first notification identifying the first file;
submitting, by the overlay optimizer service, a request to commit the first file;
intercepting, by the second overlay optimizer minifilter, a write request that is being passed down the unprotected I/O stack;
based on the first notification, determining, by the second overlay optimizer minifilter, that the write request pertains to the request to commit the first file; and
reparsing, by the second overlay optimizer minifilter, the write request to an overlay cache.

18. The computer storage media of claim 17, wherein the method further comprises:
using, by the second overlay optimizer minifilter, content of the first notification to retrieve a file ID of the first file; and
retrieving, by the second overlay optimizer minifilter, a file ID of a file that the write request targets;
wherein determining that the write request pertains to the request to commit the first file comprises comparing, by the second overlay optimizer minifilter, the file ID of the file that the write request targets to the file ID of the first file to determine that the file that the write request targets is the first file.

19. The computer storage media of claim 17, wherein the method further comprises:
receiving, by the first overlay optimizer minifilter, a directory change notification (DCN) request that targets a first directory;
creating, by the first overlay optimizer minifilter, a first duplicate DCN request and a second duplicate DCN request;
sending, by the first overlay optimizer minifilter, the first duplicate DCN request down the protected I/O stack and the second duplicate DCN request down the unprotected I/O stack;
pending, by the first overlay optimizer minifilter, the DCN request;
in response to either of the first or second duplicate DCN request being completed, copying, by the first overlay optimizer minifilter, content of the completed duplicate DCN request to the DCN request; and
completing, by the first overlay optimizer minifilter, the DCN request.

20. The computer storage media of claim 19, wherein the method further comprises:
maintaining a DCN map that associates the DCN request with the first and second duplicate DCN requests; and
employing the DCN map to determine that the completed duplicate DCN request is associated with the DCN request.

* * * * *